US012333559B2

United States Patent
Hsieh et al.

(10) Patent No.: US 12,333,559 B2
(45) Date of Patent: Jun. 17, 2025

(54) LEAD MANAGEMENT SYSTEM AND METHODS THEREOF

(71) Applicant: loanDepot.com, LLC, Foothill Ranch, CA (US)

(72) Inventors: Anthony Li Hsieh, Foothill Ranch, CA (US); Tsutomu Yebisu, Newport Beach, CA (US); John Hoon Lee, Frisco, TX (US); Saeed Ghasemzadeh, Mission Viejo, CA (US); Christian Min Kim, Irvine, CA (US)

(73) Assignee: loanDepot.com, LLC, Irvine, CA (US)

( * ) Notice: Subject to any disclaimer, the term of this patent is extended or adjusted under 35 U.S.C. 154(b) by 61 days.

(21) Appl. No.: 17/944,412

(22) Filed: Sep. 14, 2022

(65) Prior Publication Data

US 2023/0018271 A1    Jan. 19, 2023

Related U.S. Application Data

(63) Continuation-in-part of application No. 16/359,207, filed on Mar. 20, 2019, now abandoned.
(Continued)

(51) Int. Cl.
*G06Q 30/02* (2023.01)
*G06Q 30/0201* (2023.01)
*G06Q 40/02* (2023.01)

(52) U.S. Cl.
CPC ......... *G06Q 30/0201* (2013.01); *G06Q 40/02* (2013.01)

(58) Field of Classification Search
USPC .......................................................... 705/38
See application file for complete search history.

(56) References Cited

U.S. PATENT DOCUMENTS 6,519,571 B1 *   2/2003  Guheen .................. G06Q 30/02
                                                    705/14.66
2004/0064351 A1 *  4/2004  Mikurak .............. G06Q 10/087
                                                       705/22
(Continued)

FOREIGN PATENT DOCUMENTS

WO    WO 2014/053017 A1 *  4/2014   ............. G06Q 30/02

OTHER PUBLICATIONS

Retail Lead Management, 2017, www.retailleadmanagement.com/see/ (Year: 2017).*

*Primary Examiner* — Scott C Anderson
*Assistant Examiner* — George N. Proios
(74) *Attorney, Agent, or Firm* — Rutan & Tucker LLP; Ravi Mohan; Hani Z. Sayed

(57) ABSTRACT

Disclosed herein is a lead management system including, in some embodiments, a lead intake engine, a phone system, and a loan origination system. The lead intake engine includes a lead processing module configured for processing sales leads, which includes enriching original data of at least some incoming sales leads with complementary data, as well as algorithm-based scoring of the sales leads. The phone system includes a dialer configured to dial phone numbers for the sales leads from one or more dialer tables of the phone system sorted in accordance with the scores of the sales leads by the lead intake engine. The loan origination system is configured to create a sales-purposed record in a sales database for each sales lead up to at least a time of the dialer dialing a phone number associated with the record. The lead management system is optimized for speed-to-contact with telecommunications regulatory compliance.

20 Claims, 11 Drawing Sheets

Related U.S. Application Data

(60) Provisional application No. 62/646,838, filed on Mar. 22, 2018.

(56) References Cited

U.S. PATENT DOCUMENTS

| | | | |
|---|---|---|---|
| 2004/0143473 A1* | 7/2004 | Tivey | G06Q 10/0631 |
| | | | 705/1.1 |
| 2006/0155639 A1* | 7/2006 | Lynch | G06Q 40/025 |
| | | | 705/38 |
| 2007/0064915 A1* | 3/2007 | Moore, Jr. et al. | 379/265.12 |
| 2015/0103998 A1* | 4/2015 | Rosandich et al. | H04M 3/51 |

* cited by examiner

LEAD MANAGEMENT SYSTEM AND METHODS THEREOF

PRIORITY

This application is a continuation-in-part of, and claims the benefit of, U.S. patent application, entitled "Lead Management System and Methods Thereof," filed on Mar. 20, 2019, and having application Ser. No. 16/359,207, which claims the benefit of, and priority to, U.S. Provisional Application, filed on Mar. 22, 2018 and having application Ser. No. 62/646,838, the entirety of each of said applications being incorporated herein by reference.

FIELD

Embodiments of the present disclosure generally relate to banking. More specifically, embodiments of the disclosure relate to a lead management system and methods thereof in support of a digital lending platform.

BACKGROUND

An important financial service provided by financial institutions is lending, which can include originating loans, servicing loans, or both originating and serving loans. There are many different types of loans available through such financial institutions. Broadly, the different types of loans are divided between secured loans and unsecured loans, wherein the secured loans are secured against borrowers' assets. Secured loans include, for example, mortgages, home equity loans, home equity lines of credit, or automotive loans. Unsecured loans include, for example, personal loans, personal lines of credit, student loans, or credit cards.

Lending, particularly originating loans such as mortgages, requires many fragmented, often manual processes of both borrowers and lenders. For a borrower, such processes include filling out a loan application and providing information in support of the loan application, the supporting information including, for example, employment, income, asset, and liability information. For a lender, such processes include processing the borrower's loan application and verifying the supporting information, underwriting a potential loan and performing a detailed risk assessment in view of the supporting information, and, ultimately, upon approval from underwriting, funding the loan. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated lending platform that dissolves lines between lending for secured and unsecured loan types. Disclosed herein is a lead management system and methods thereof in support of a digital lending platform.

SUMMARY

Disclosed herein is a digital lending platform including, in some embodiments, a lead management system. The lead management system includes a lead intake engine, a phone system, and a loan origination system. The lead intake engine includes a lead processing module configured for processing sales leads. Processing sales lead includes enriching original data of at least a portion of incoming sales leads with complementary data to convert the portion of incoming sales leads into enriched sales leads. Processing sales leads also includes scoring the enriched sales leads and any of the incoming sales leads not converted to the enriched sales leads with scores by a scoring algorithm. The phone system includes a dialer configured to dial phone numbers for the sales leads from one or more dialer tables of the phone system. The one or more dialer tables are sorted in accordance with the scores of the sales leads by the lead intake engine. The loan origination system is configured to create a sales-purposed record in a sales database for each sales lead using the original data, the complementary data, or a combination thereof. The loan origination system is configured to create the record up to at least a time of the dialer dialing a phone number associated with the record. The lead management system is optimized for speed-to-contact with telecommunications regulatory compliance.

In some embodiments, the lead processing module includes a deduplicating filter, a validating module, and a lead-enriching module. The deduplicating filter is configured to remove duplicates of the sales leads. The validating module is configured to validate loan inquiries of the sales leads, the original data of the incoming sales leads, or both. The lead-enriching module is configured to coordinate with third-party data-enriching providers to enrich the original data of the portion of incoming sales leads with the complementary data to convert the portion of incoming sales leads into enriched sales leads.

In some embodiments, the enriched sales leads are intermittently further enriched by third-party data-enriching providers by way of an application programming interface of the lead management system exposed to the third-party data-enriching providers. Any of the enriched sales leads further enriched by the third-party data-enriching providers are rescored by the scoring algorithm. The one or more dialer tables of the phone system are concomitantly sorted in accordance with the scores of the sales leads by the lead intake engine while the enriched sales leads are further enriched by the third-party data-enriching providers.

In some embodiments, the complementary data is selected from Telephone Consumer Protection Act ("TCPA")-compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

In some embodiments, the phone system includes a scripter configured to provide customized scripts to Customer Lending Representatives ("CLRs") in a call center. The scripter is configured to provide each customized script with one or more questions for each sales lead in accordance with the original data, the complementary data, or the combination thereof of the sales lead; an age of the sales lead; a campaign of the sales lead; or a combination thereof.

In some embodiments, any answers provided by potential borrowers to the questions asked by the CLRs from the customized scripts are manually or automatically logged in the one or more dialer tables. The answers are logged in the one or more dialer tables to i) enrich the original data of a different portion of the incoming sales leads and, thereby, convert the different portion of incoming sales leads into normalized sales leads, ii) further enrich the enriched sales leads with the answers provided by the potential borrowers, or iii) both. Each normalized sales lead or enriched sales lead further enriched with the answers provided by the potential borrowers is rescored by the scoring algorithm up to at least a time of call transfer from a CLR to a licensed loan officer ("LLO") by way of the phone system.

In some embodiments, each LLO of a number of LLOs is assigned a unique phone number and one or more associated LLO attributes configured for attribute-based routing of phone calls by an automatic call distributor. The one or more attributes of the LLO are selected from one or more licensing states, experience with one or more particular loan products, one or more languages spoken, and combinations thereof. Call transfers from the CLRs to any available LLOs are in accordance with matches between the one or more LLO attributes and the normalized sales leads or enriched sales leads further enriched with the answers provided by the potential borrowers.

In some embodiments, the digital lending platform further includes one or more enterprise marketing databases. The one or more enterprise marketing databases are configured to store marketing information including one or more points of interaction for each potential borrower having established at least one point of interaction with the digital lending platform. The loan origination system is configured to request the marketing information and populate the sales-purposed record for each sales lead with the one or more points of interaction for each potential borrower.

In some embodiments, the sales database is configured with a configurable mask or a mask-enabling viewing tool to mask information not relevant to one or more sales strategies, information potentially detrimental to the one or more sales strategies, or a combination thereof.

Also disclosed herein is a lead management system including, in some embodiments, a lead intake engine, a phone system, and a loan origination system. The lead intake engine includes a lead processing module configured for processing sales leads. Processing sales lead includes enriching original data of at least a portion of incoming sales leads with complementary data to convert the portion of incoming sales leads into enriched sales leads. The lead processing module includes a deduplicating filter, a validating module, a lead-enriching module, and a scoring algorithm. The deduplicating filter is configured to remove duplicates of the sales leads. The validating module is configured to validate loan inquiries of the sales leads, the original data of the incoming sales leads, or both. The lead-enriching module is configured to coordinate with third-party data-enriching providers to enrich the original data of the portion of incoming sales leads with the complementary data to convert the portion of incoming sales leads into enriched sales leads. The scoring algorithm is configured to score the enriched sales leads and any of the incoming sales leads not converted to the enriched sales leads with scores. The phone system includes a dialer configured to dial phone numbers for the sales leads from one or more dialer tables of the phone system. The one or more dialer tables are sorted in accordance with the scores of the sales leads by the lead intake engine. The loan origination system is configured to create a sales-purposed record in a sales database for each sales lead using the original data, the complementary data, or a combination thereof. The loan origination system is configured to create the record up to at least a time of the dialer dialing a phone number associated with the record. The lead management system is optimized for speed-to-contact with telecommunications regulatory compliance.

In some embodiments, the phone system includes a scripter configured to provide customized scripts to CLRs in a call center. The scripter is configured to provide each customized script with one or more questions for each sales lead in accordance with the original data, the complementary data, or the combination thereof of the sales lead; an age of the sales lead; a campaign of the sales lead; or a combination thereof. Any answers provided by potential borrowers to the questions asked by the CLRs from the customized scripts are manually or automatically logged in the one or more dialer tables. The answers are logged in the one or more dialer table to i) enrich the original data of a different portion of the incoming sales leads and, thereby, convert the different portion of incoming sales leads into normalized sales leads, ii) further enrich the enriched sales leads with the answers provided by the potential borrowers, or iii) both. Each normalized sales lead or enriched sales lead further enriched with the answers provided by the potential borrowers is rescored by the scoring algorithm up to at least a time of call transfer from a CLR to an LLO by way of the phone system.

Also disclosed herein is a non-transitory computer-readable medium ("CRM") including executable instructions that, when executed on a server host by one or more processors, cause the server host to instantiate at least a portion of a lead management system configured to perform a number of steps. The number of steps include, in some embodiments, processing sales leads with a lead processing module of a lead intake engine, sorting one or more dialer tables of a phone system, dialing phone numbers for the sales leads with a dialer of the phone system, and creating a sales-purposed record for each sales lead with a loan origination system. Processing the sales leads includes enriching original data of at least a portion of incoming sales leads with complementary data to convert the portion of incoming sales leads into enriched sales leads. Processing the sales leads also includes scoring the enriched sales leads and any of the incoming sales leads not converted to the enriched sales leads with scores by a scoring algorithm. Sorting the one or more dialer tables includes sorting the one or more dialer tables in accordance with the scores of the sales leads by the lead intake engine. Dialing the phone numbers for the sales leads includes dialing the phone numbers from the one or more dialer tables with the dialer. Creating the sales-purposed record includes creating the record in a sales database of the loan origination system for each sales lead using the original data, the complementary data, or a combination thereof. The record is created in the sales database up to at least a time of the dialer dialing a phone number associated with the record. Components of the lead intake engine, the phone system, and the loan origination system form the lead management system optimized for speed-to-contact with telecommunications regulatory compliance.

In some embodiments, the instructions on the CRM further cause the lead management system to remove duplicates of the sales leads, validate loan inquiries of the sales leads, and enrich the original data of the portion of incoming sales leads. Removing the duplicates of the sales leads includes removing the duplicates with a deduplicating filter of the lead processing module. Validating loan inquiries of the sales leads includes validating the loan inquiries, themselves, of the sales leads, the original data of the incoming sales leads, or both with a validating module of the lead processing module. Enriching the original data of the portion of incoming sales leads includes enriching the original data with the complementary data to convert the portion of incoming sales leads into enriched sales leads by way of a lead-enriching module configured to coordinate with third-party data-enriching providers.

In some embodiments, the instructions on the CRM further cause the lead management system to enrich already enriched sales leads, rescore any of the already enriched sales leads, and sort the one or more dialer tables in accordance with the scores of the sales leads. Further enriching already enriched sales leads includes intermittently further enriching the already enriched sales leads by way of third-party data-enriching providers and an application programming interface of the lead management system exposed to the third-party data-enriching providers. Rescoring any of the already enriched sales leads includes rescoring by the scoring algorithm any of the already enriched sales leads further enriched by the third-party data-enriching providers. Sorting the one or more dialer tables includes concomitantly sorting the one or more dialer tables in accordance with the scores of the sales leads by the lead intake engine while or, otherwise, at a same time as, the already enriched sales leads are further enriched by the third-party data-enriching providers.

In some embodiments, the complementary data is selected from TCPA-compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

In some embodiments, the instructions on the CRM further cause the lead management system to provide customized scripts with a scripter of the phone system to CLRs in a call center. Each customized script includes one or more questions for each sales lead in accordance with the original data, the complementary data, or the combination thereof of the sales lead; an age of the sales lead; a campaign of the sales lead; or a combination thereof.

In some embodiments, the instructions on the CRM further cause the lead management system to log in the one or more dialer tables any answers provided by potential borrowers to the questions asked by the CLRs from the customized scripts, as well as rescore by the scoring algorithm each normalized sales lead or enriched sales lead further enriched with the answers provided by the potential borrowers. Logging in the one or more dialer tables any answers provided by the potential borrowers includes automatically logging in the one or more dialer tables any of the answers provided by the potential borrowers to the questions asked by the CLRs from the customized scripts. Alternatively, the CLRs can manually enter any of the answers in the one or more dialer tables to log in the one or more dialer tables any of the answers provided by the potential borrowers. The answers are logged in the one or more dialer table to i) enrich the original data of a different portion of the incoming sales leads and, thereby, convert the different portion of incoming sales leads into normalized sales leads, ii) further enrich the enriched sales leads with the answers provided by the potential borrowers, or iii) both. Rescoring by the scoring algorithm includes rescoring each normalized sales lead or enriched sales lead further enriched with the answers provided by the potential borrowers up to at least a time of call transfer from a CLR to an LLO by way of the phone system.

In some embodiments, the instructions on the CRM further cause the lead management system to assign to each LLO of a number of LLOs a unique phone number and one or more associated LLO attributes configured for attribute-based routing of phone calls by an automatic call distributor. The one or more attributes of the LLO are selected from one or more licensing states, experience with one or more particular loan products, one or more languages spoken, and combinations thereof. Call transfers from CLRs to any available LLOs are in accordance with matches between the one or more LLO attributes and the normalized sales leads or enriched sales leads further enriched with the answers provided by the potential borrowers.

In some embodiments, the instructions on the CRM further cause the lead management system to store marketing information in one or more enterprise marketing databases, request the marketing information from the one or more enterprise marketing databases by the loan origination system, and populate the sales-purposed record for each sales lead with the marketing information. The marketing information includes one or more points of interaction for each potential borrower having established at least one point of interaction with the lead management system.

In some embodiments, the instructions on the CRM further cause the lead management system to mask with a configurable mask or a mask-enabling viewing tool information not relevant to one or more sales strategies, information potentially detrimental to the one or more sales strategies, or a combination thereof in the sales database.

In an exemplary embodiment, a digital lending platform operable by way of a set of executable instructions stored in a non-transient machine-readable medium comprises: a lead intake engine including a lead processing module for processing sales leads including enriching original data of at least a portion of incoming sales leads with complementary data to convert the portion of incoming sales leads into enriched sales leads, and scoring the enriched sales leads and any of the incoming sales leads not converted to the enriched sales leads with scores by a scoring algorithm; a phone system including a dialer for dialing phone numbers for the sales leads from one or more dialer tables of the phone system sorted in accordance with the scores of the sales leads by the lead intake engine; and a loan origination system for creating a sales-purposed record in a sales database for each sales lead using the original data, the complementary data, or a combination thereof up to at least a time of the dialer dialing a phone number associated with the record.

In another exemplary embodiment, the lead processing module includes a deduplicating filter for removing duplicates of the sales leads, a validating module for validating loan inquiries of the sales leads, the original data of the incoming sales leads, or both, and a lead-enriching module for coordinating with third-party data-enriching providers to enrich the original data of the portion of incoming sales leads with the complementary data to convert the portion of incoming sales leads into the enriched sales leads. In another exemplary embodiment, the enriched sales leads are intermittently further enriched by third-party data-enriching providers by way of an application programming interface of a lead management system that is exposed to the third-party data-enriching providers, wherein any of the enriched sales leads further enriched by the third-party data-enriching providers are rescored by the scoring algorithm, and wherein the one or more dialer tables of the phone system are concomitantly sorted in accordance with the scores of the sales leads by the lead intake engine while the enriched sales leads are further enriched by the third-party data-enriching providers.

In another exemplary embodiment, the lead management system is operable by way of a set of executable instructions stored in a non-transient machine-readable medium and comprises components of the lead intake engine, the phone system, and the loan origination system. In another exemplary embodiment, the lead management system is optimized for speed-to-contact with telecommunications regulatory compliance. In another exemplary embodiment, the complementary data is selected from Telephone Consumer Protection Act compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

In another exemplary embodiment, the phone system includes a scripter for providing customized scripts to customer liaison representatives in a call center, the scripter configured to provide each customized script with one or more questions for each sales lead in accordance with the original data, the complementary data, or the combination thereof of the sales lead; an age of the sales lead; a campaign of the sales lead; or a combination thereof. In another exemplary embodiment, any answers provided by potential borrowers to the questions asked by the customer liaison representatives from the customized scripts are manually or automatically logged in the one or more dialer tables to enrich the original data of a different portion of the incoming sales leads and, thereby, convert the different portion of incoming sales leads into normalized sales leads, further enrich the enriched sales leads with the answers provided by the potential borrowers, or both, and wherein each normalized sales lead or enriched sales lead further enriched with the answers provided by the potential borrowers is rescored by the scoring algorithm up to at least a time of call transfer from a customer liaison representative to a licensed loan officer by way of the phone system.

In another exemplary embodiment, each licensed loan officer of a plurality of licensed loan officers is assigned a unique phone number and one or more associated licensed loan officer attributes configured for attribute-based routing of phone calls by an automatic call distributor, the one or more attributes of the licensed loan officer selected from one or more licensing states, experience with one or more particular loan products, one or more languages spoken, and combinations thereof, and wherein call transfers from the customer liaison representatives to any available licensed loan officers are in accordance with matches between the one or more LLO attributes and the normalized sales leads or enriched sales leads further enriched with the answers provided by the potential borrowers.

In another exemplary embodiment, the digital lending platform further comprises: one or more enterprise marketing databases for storing marketing information including one or more points of interaction for each potential borrower having established at least one point of interaction with the digital lending platform, wherein the loan origination system is configured to request the marketing information and populate the sales-purposed record for each sales lead with the one or more points of interaction for each potential borrower. In another exemplary embodiment, the sales database is configured with a configurable mask or a mask-enabling viewing tool to mask information not relevant to one or more sales strategies, information potentially detrimental to the one or more sales strategies, or a combination thereof.

In an exemplary embodiment, a method for a non-transitory computer-readable medium including executable instructions that, when executed on a server host by one or more processors, cause the server host to instantiate at least a portion of a lead management system configured to perform a plurality of steps comprises: processing sales leads with a lead processing module of a lead intake engine including enriching original data of at least a portion of incoming sales leads with complementary data to convert the portion of incoming sales leads into enriched sales leads, and scoring the enriched sales leads and any of the incoming sales leads not converted to the enriched sales leads with scores by a scoring algorithm; sorting one or more dialer tables of a phone system in accordance with the scores of the sales leads by the lead intake engine; dialing phone numbers for the sales leads from the one or more dialer tables with a dialer of the phone system; and creating a sales-purposed record in a sales database of the loan origination system for each sales lead using the original data, the complementary data, or a combination thereof up to at least a time of the dialer dialing a phone number associated with the record; wherein components of the lead intake engine, the phone system, and the loan origination system form the lead management system optimized for speed-to-contact with telecommunications regulatory compliance.

In another exemplary embodiment, the plurality of steps further comprises removing duplicates of the sales leads with a deduplicating filter of the lead processing module; validating loan inquiries of the sales leads, the original data of the incoming sales leads, or both with a validating module of the lead processing module; and enriching the original data of the portion of incoming sales leads with the complementary data to convert the portion of incoming sales leads into the enriched sales leads by way of a lead-enriching module configured to coordinate with third-party data-enriching providers.

In another exemplary embodiment, the plurality of steps further comprises intermittently further enriching already enriched sales leads by way of third-party data-enriching providers and an application programming interface of the lead management system exposed to the third-party data-enriching providers; rescoring by the scoring algorithm any of the already enriched sales leads further enriched by the third-party data-enriching providers; and concomitantly sorting the one or more dialer tables of the phone system in accordance with the scores of the sales leads by the lead intake engine while the already enriched sales leads are further enriched by the third-party data-enriching providers.

In another exemplary embodiment, the complementary data is selected from Telephone Consumer Protection Act compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

In another exemplary embodiment, the plurality of steps further comprises providing customized scripts with a scripter of the phone system to customer liaison representatives in a call center, wherein each customized script includes one or more questions for each sales lead in accordance with the original data, the complementary data, or the combination thereof for the sales lead, an age of the sales lead, a campaign of the sales lead, or a combination thereof. In another exemplary embodiment, the plurality of steps further comprises manually or automatically logging in the one or more dialer tables any answers provided by potential borrowers to the questions asked by the customer liaison representatives from the customized scripts to enrich the original data of a different portion of the incoming sales leads and, thereby, convert the different portion of incoming sales leads into normalized sales leads, further enrich the enriched sales leads with the answers provided by the potential borrowers, or both; and rescoring by the scoring algorithm each normalized sales lead or enriched sales lead further enriched with the answers provided by the potential borrowers, wherein the rescoring is up to at least a time of call transfer from a customer liaison representative to a licensed loan officer by way of the phone system.

In another exemplary embodiment, the plurality of steps further comprises assigning to each licensed loan officer of a plurality of licensed loan officers a unique phone number and one or more associated licensed loan officer attributes configured for attribute-based routing of phone calls by an automatic call distributor, the one or more attributes of the licensed loan officer selected from one or more licensing states, experience with one or more particular loan products, one or more languages spoken, and combinations thereof, wherein call transfers from customer liaison representatives to any available licensed loan officers are in accordance with matches between the one or more licensed loan officer attributes and the normalized sales leads or enriched sales leads further enriched with the answers provided by the potential borrowers.

In another exemplary embodiment, the plurality of steps further comprises storing marketing information in one or more enterprise marketing databases, the marketing information including one or more points of interaction for each potential borrower having established at least one point of interaction with the lead management system; requesting the marketing information from the one or more enterprise marketing databases by the loan origination system; and populating the sales-purposed record for each sales lead with the one or more points of interaction for each potential borrower. In another exemplary embodiment, the plurality of steps further comprises masking with a configurable mask or a mask-enabling viewing tool information not relevant to one or more sales strategies, information potentially detrimental to the one or more sales strategies, or a combination thereof in the sales database.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
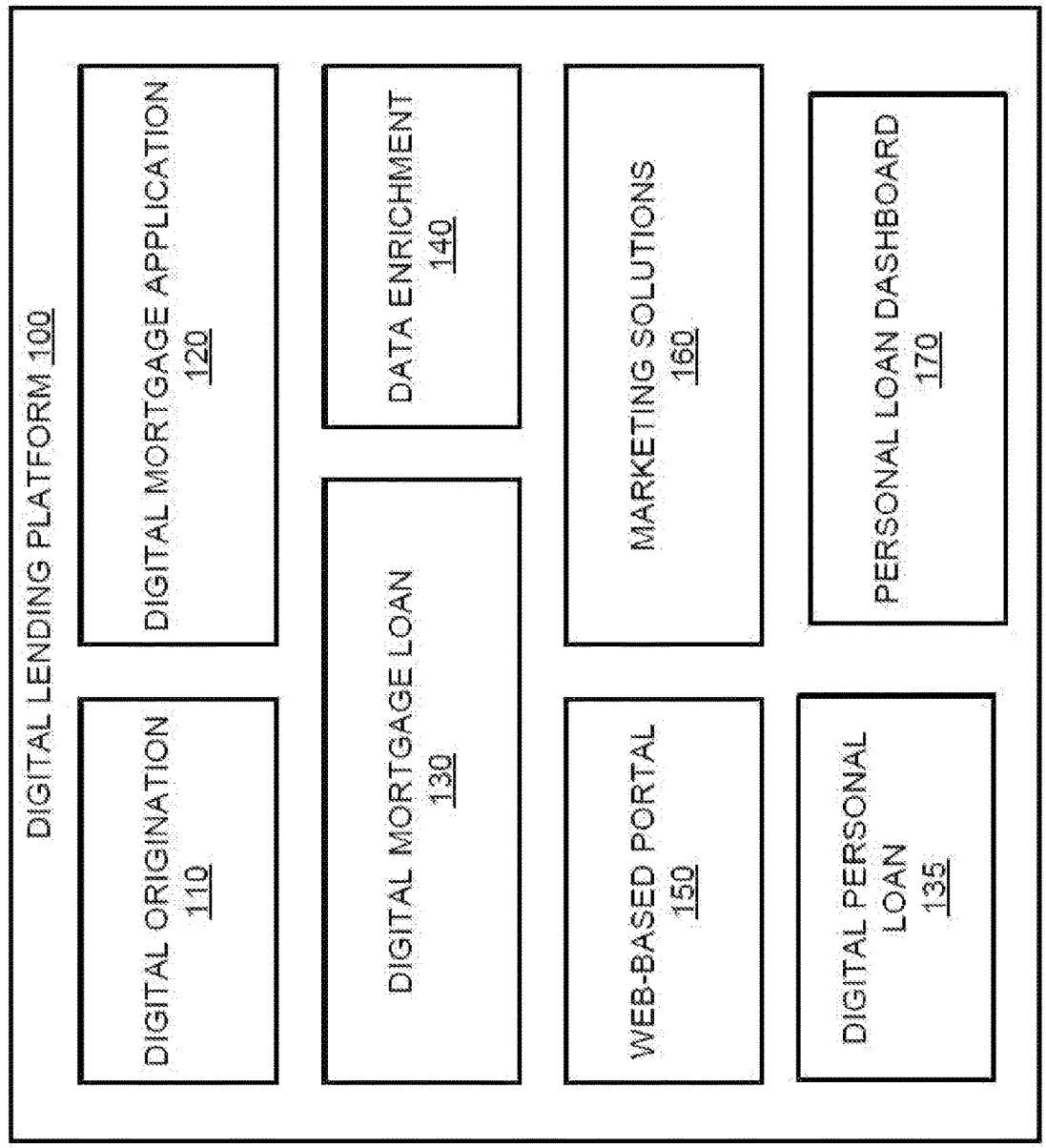
FIG. 1 provides a schematic illustrating a digital lending platform in accordance with some embodiments.
Figure 1A:
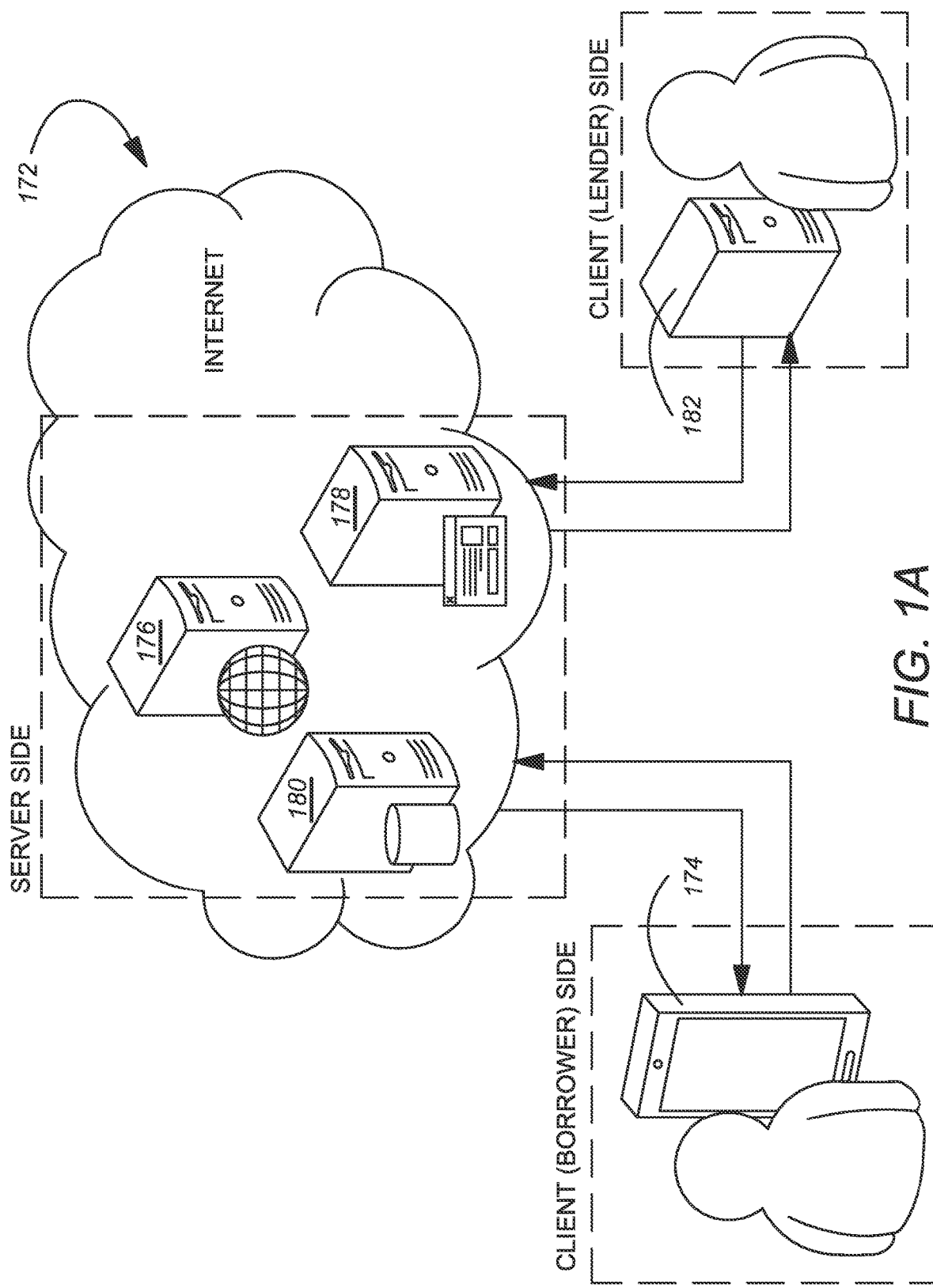
FIG. 1A provides a schematic illustrating a network of client and server hosts supporting a digital mortgage application system in accordance with some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As previously set forth, lending requires many fragmented, often manual processes of both borrowers and lenders. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated lending platform that dissolves lines between lending for secured and unsecured loan types. Disclosed herein is a lead management system and methods thereof in support of a digital lending platform.

FIG. 1 provides a schematic illustrating a digital lending platform 100 in accordance with some embodiments. The digital lending platform 100 includes networked hardware and software, as well as processes thereof, providing one or more of digital origination 110, a digital mortgage application 120, a digital mortgage loan 130, a digital personal loan 135, data enrichment 140, a web-based portal 150, marketing solutions 160, or a personal loan dashboard 170.

With respect to the digital origination 110, the digital origination 110 includes, but is not limited to, one or more of real-time pipeline views; quick credit runs; quick loan quotes; flexible loan comparisons; quick loan pre-qualifications; intuitive and interactive Uniform Residential Loan Applications; or loan approval notifications. Features and benefits of the digital origination 110 include, but are not limited to, one or more of 24/7 web-based pipeline visibility; access anytime from anywhere; reduced errors by way of using existing pricing and fee engines; quick creation of multiple loan scenarios; speedy fee worksheets; quick loan quotes; quick loan pre-qualifications; quick loan-locks; quick completion of Uniform Residential Loan Applications; or 100% visibility from the loan quotes to the loan locks.

With respect to the digital mortgage application 120, the digital mortgage application 120 includes, but is not limited to, one or more of finding loan officers or other lender representatives by lender name or branch; automated income and employment verifications; automated asset verifications; or quick application submissions. Features and benefits of the digital mortgage application 120 include, but are not limited to, one or more of automatic connections of borrowers with loan officers or other lender representatives; loan-officer notifications regarding completion of borrowers' applications; easy-to-collect information on borrowers and properties; use anytime from anywhere; or quick borrower completion and lender processing of applications.

With respect to the digital mortgage loan 130, the digital mortgage loan 130 includes, but is not limited to, one or more of 100% digital mortgage applications; automated income and employment verifications; automated asset verifications; immediate connections of borrowers to loan officers or other lender representatives; or quick loan approvals. Features and benefits of the digital mortgage loan 130 include, but are not limited to, one or more of self-service software applications for borrowers on mobile devices or personal computers; pricing for loan offers; loan locks; or quick applications anytime from anywhere.

With respect to the digital personal loan 135, the digital personal loan 135 includes, but is not limited to, one or more of quick risk-free quotes; automatic links to borrowers' bank accounts; uploading borrower identification by taking and uploading pictures; digital acceptance of loan packets; or quick auto-deposits of loan disbursements. Features and benefits of the digital personal loan 135 include, but are not limited to, one or more of quick pricing, locking, and loan offers 24/7 from anywhere; quick risk-free quotes; quick loan applications with bank lending; creation of new applications and generation of loan offers via proprietary credit decline, fraud and pricing engines; verification of borrower information and documentation, as well as fraud checks in a single view; or quick loan applications and funding.

With respect to data enrichment 140, features and benefits of the data enrichment 140 include, but are not limited to, one or more of infusing data seamlessly into the digital loan process; increased accuracy on loan applications; reduced potential for fraud; or accelerated verifications.

With respect to the web-based portal 150, the web-based portal 150 includes, but is not limited to, one or more of secure borrower portals; instant access to borrower's to-do lists; electronic signing of borrowers' documents; secure messaging for borrowers; or loan-team access for borrowers 24/7. Features and benefits of the web-based portal 150 include, but are not limited to, one or more of notifications to update lenders or their representatives on borrowers' activities; keeping borrowers connected and in sync with various loan processes; 24/7 accessibility and visibility on multiple devices; secure document uploads in a secure environment; collection of documentation for loan officers or other lender representatives; reduction in turn times and fall out rates; or increased speed and efficiencies.

With respect to the personal loan dashboard 170, the personal loan dashboard 170 includes, but is not limited to, one or more of registration pages; information and documentation verifications; one-click repricing; disposition applications; call recording for confirmation of borrower understanding; or pipeline management. Features and benefits of the personal loan dashboard 170 include, but are not limited to, one or more of a Certified Lender Program ("CLP") agent portal coupled to a proprietary loan origination system; seamless workflow management; or one-portal access to all loan processes.

Figure 1B:
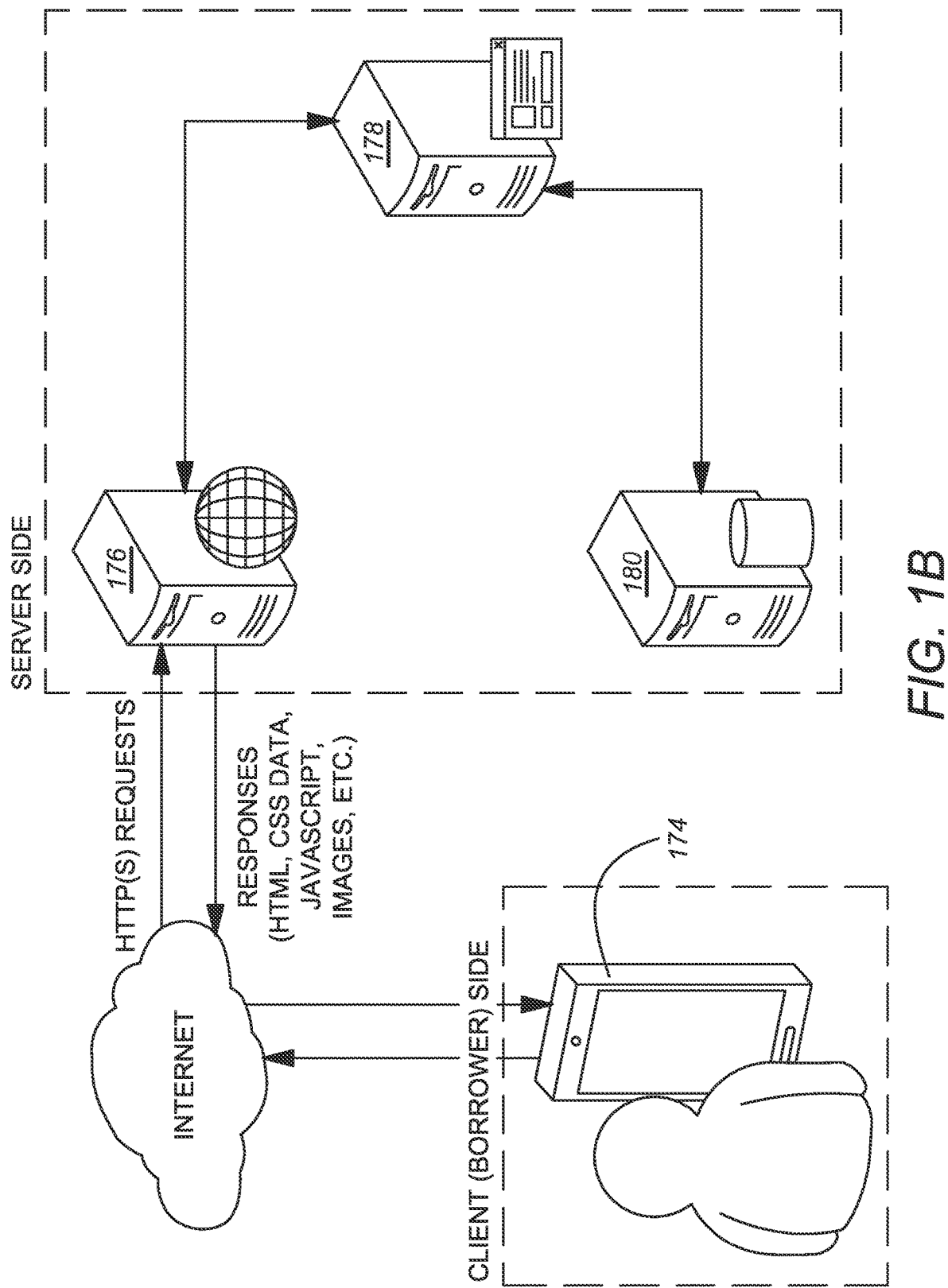
FIG. 1B provides a schematic illustrating a borrower's client host and one or more server hosts supporting a digital mortgage application system in accordance with some embodiments.
Figure 1C:
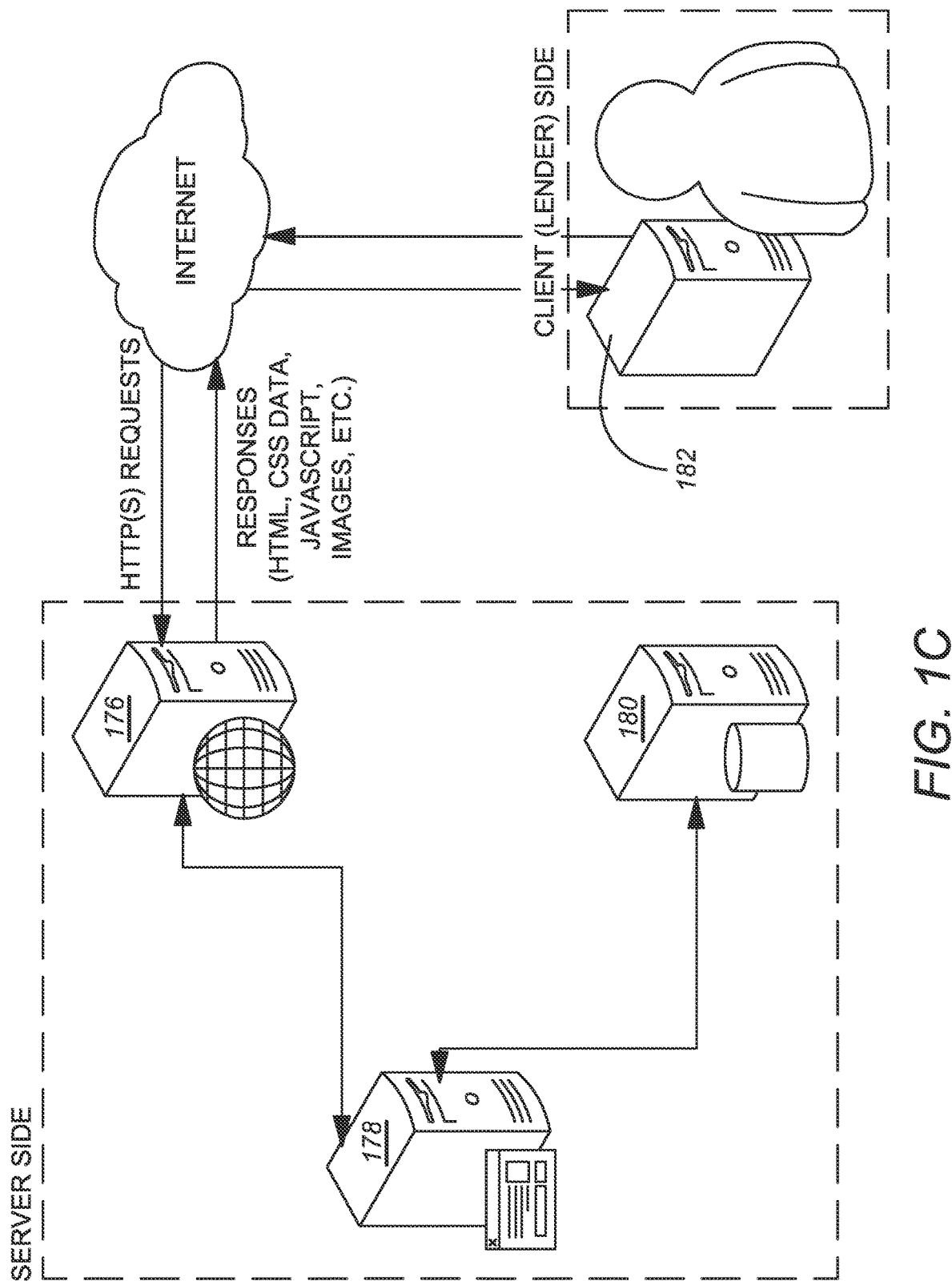
FIG. 1C provides a schematic illustrating a lender's client host and one or more server hosts supporting a digital mortgage application system in accordance with some embodiments.
Figure 1D:
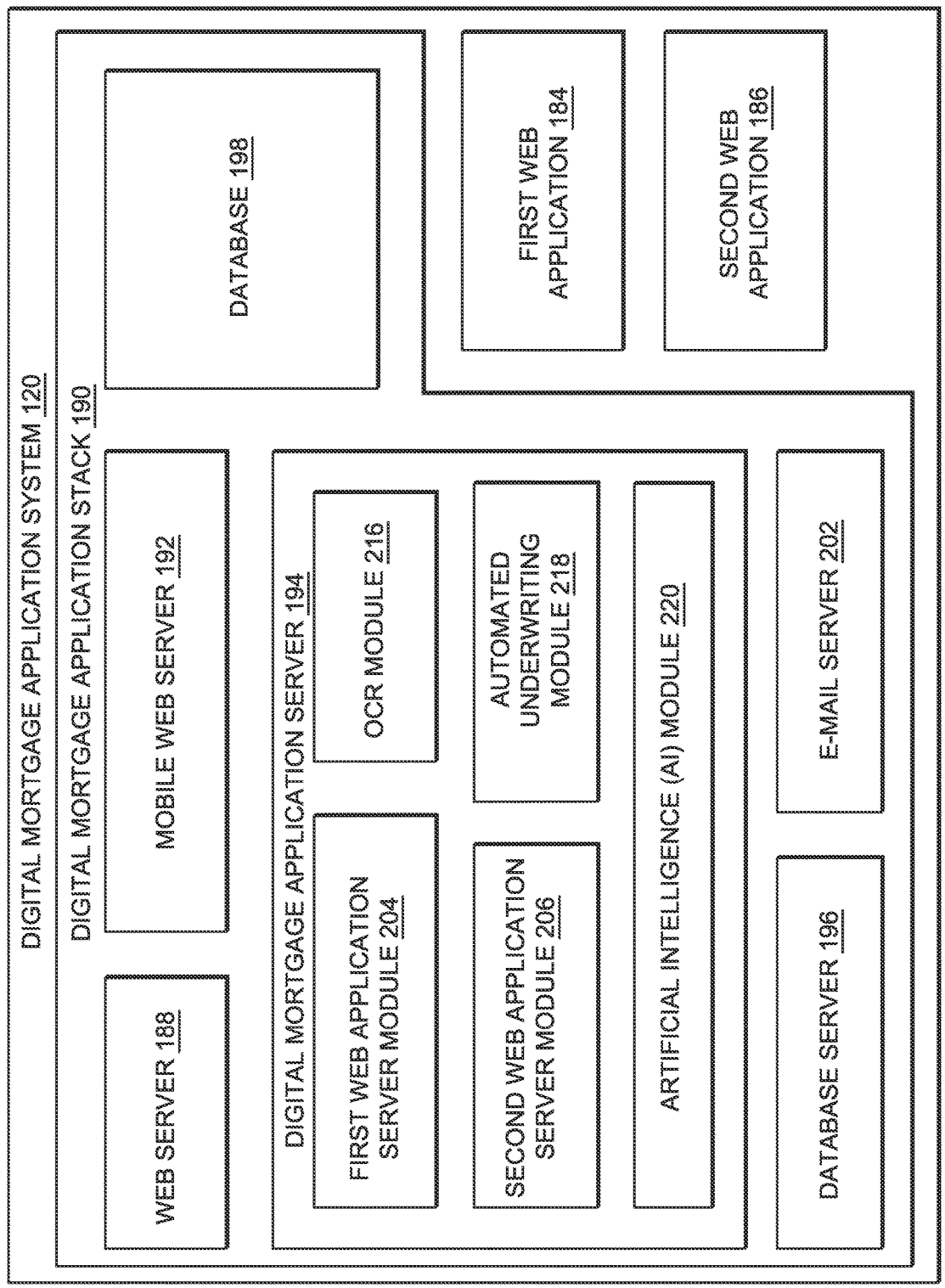
FIG. 1D provides a schematic illustrating a digital mortgage application system in accordance with some embodiments.

FIGS. 1A-1D provide schematics illustrating a network 172 of client and server hosts supporting the digital mortgage application system 120 in accordance with some embodiments. FIG. 1B provides a schematic illustrating a borrower's client host 174 and one or more server hosts such as server hosts 176, 178, and 180 supporting the digital mortgage application system 120. FIG. 1C provides a schematic illustrating a lender's client host 182 and the one or more server hosts supporting the digital mortgage application system 120. FIG. 1D provides a schematic illustrating the digital mortgage application system 120 with a number of modules or components thereof in accordance with some embodiments.

As shown in FIGS. 1A-1D, the digital mortgage application system 120 includes a first web application 184 configured to run at least in part from a primary memory of a first client host such as the borrower's client host 174 (e.g., mobile device, personal computer, etc.), a second web application 186 configured to run at least in part from a primary memory of a second client host such as the lender's client host 182 (e.g., personal computer, mobile device, etc.), and a digital mortgage application stack 190 configured to run at least in part from a primary memory of at least one server host such as any one or more of server hosts 176, 178, or 180. While much of the digital mortgage application system 120 is described herein in terms of web applications for client hosts, it should be understood that such client host can alternatively run local applications native to the operating systems of the client hosts.

The digital mortgage application stack 190 includes a web server 188, a separate mobile web server 192 if not integrated with the web server 188, a digital mortgage application server 194, a database server 196 with an associated database 198, and an e-mail server 202 configured to send and receive secured e-mail messages.

The digital mortgage application server 194 includes a first web application server module 204 configured to service requests from one of more client hosts such as the borrower's client host 174 for the first web application 184. In some embodiments, the first web application server module 204 is a mobile web application server module configured to service requests from one of more mobile devices (e.g., smart phones, tablet computers, etc.) for a mobile web application version of the first web application 184. The digital mortgage application server 190 further includes a second web application server module 206 configured to service requests from one of more client hosts such as the lender's client host 182 for the second web application 186. In some embodiments, the second web application server module 206 is a mobile web application server module configured to service requests from one of more mobile devices (e.g., smart phones, tablet computers, etc.) for a mobile web application version of the first web application 184.

The digital mortgage application server 194 further includes an OCR module 216 configured to recognize text in borrowers' digital photograph files or other image-based files, extract the text from the digital photograph files or the other image-based files, and provide the text by way of the web server 188 for automated information-filling processes in digital mortgage applications. Such automated information-filling processes, which are among many described herein, can be used to at least complement borrower-provided information, thereby providing data enrichment, as well as cross checks for the borrower-provided information.

The digital mortgage application server 194 further includes an automated underwriting module 218 configured to perform detailed risk assessments in view of borrower-related information for automatically underwriting one or more potential loans per borrower for discussion with a lender representative. As will be appreciated, automatically underwriting loans requires obtaining and processing various fragmented pieces of information, such as a loan application filled out by the borrower and any other information provided in support of the loan application, including, for example, employment, income, asset, and liability information, and the like. Automatically underwriting loans includes processing the borrower's loan application and verifying the supporting information, performing a detailed risk assessment in view of the supporting information, and, upon approval from underwriting, funding the loan. Further, such processes are highly specific to loan type. It is contemplated that, in some embodiments, an artificial intelligence model can be configured to accurately perform one or more of the steps comprising automatically underwriting loans, as described herein.

As shown in FIG. 1D, the digital mortgage application server 194 further includes an artificial intelligence (AI) module 220 that may be configured to train one or more AI (e.g., machine learning or other suitable AI) models to perform one or more steps of the invention. In some embodiments, the AI module 220 can be implemented using any of various techniques including, without any limitation, case-based reasoning, rule-based systems, fuzzy models, genetic algorithms, cellular automata, multi-agent systems, swarm intelligence, reinforcement learnings, artificial neural networks, hybrid systems, and the like. In one embodiment, the AI module 220 may employ an artificial neural network to obtain and process fragmented pieces of information, as mentioned above. In some embodiments, the AI module 220 may be trained on dataset(s) representing user account histories and/or previous readjustments, determinations, qualifying offers, weights, metrics, thresholds, qualifying scores, or any other suitable or relevant training data. In some embodiments, the AI module 220 may be trained on the specific user's account(s) and/or credit history.

In some embodiments, the AI module 220 may be configured to self-correct and improve based on a reward feedback circuit for modifying the one or more assigned weights and/or unique thresholds. For example, upon a readjustment of the weights of metrics, the readjustment values can be measured as leading to a desired outcome or undesired outcome according to one or more criteria, then fed back into the AI module 220 as training data. As the AI module 220 further trains on the readjustments it makes and whether those readjustments are desirable or undesirable, the AI module 220 self-corrects and improves as it continues to make readjustments. A wide variety of potential AI module 220 can be employed for such a self-correcting technique. In some embodiments, one or more AI models comprising the AI module 220 may be used in a similar manner for other determinations, computations, and/or predictions within the system. In some embodiments, one or more AI models comprising the AI module 220 may be configured to automatically generate any one or more of metrics, weights, thresholds, tiers, qualifying scores for tiers, qualifying offers, reports, or any other suitable aspect of the systems described herein, without limitation. In some embodiments, such AI models comprising the AI module 220 may be configured to similarly self-correct and improve this generation based on feedback reward circuits.

The first web application 184 is configured to present the borrower GUI within a web browser on a display of the first client host such as the borrower's client host 174. In some embodiments, the first web application 184 is a mobile web application configured to present the borrower GUI within a mobile web browser on a touchscreen of a mobile device as the first client host. The borrower GUI includes a digital mortgage application divided into a number of borrower-fillable sections configured to hold borrower-related information. The sections configured to hold the borrower-related information may include one or more sections selected from a borrower profile section, a subject property section, an employment history section, and an income-and-asset information section. Some of the sections may be configured for optionally automatically filling in one or more portions of the borrower-related information. In such sections, one or more user-operable graphical elements (e.g., on-screen buttons) per section may be configured to commence the information-filling process for that section automated by one or more servers (e.g., the web server 188, the digital mortgage application server 194, the database server 196, or a combination thereof) of the digital mortgage application stack 190 upon activation of the one or more graphical elements. The sections may be configured to hold the borrower-related information at least until transferred to the database server 196 and stored in the database 198 on a storage device of, for example, the server host 180.

Figure 2:
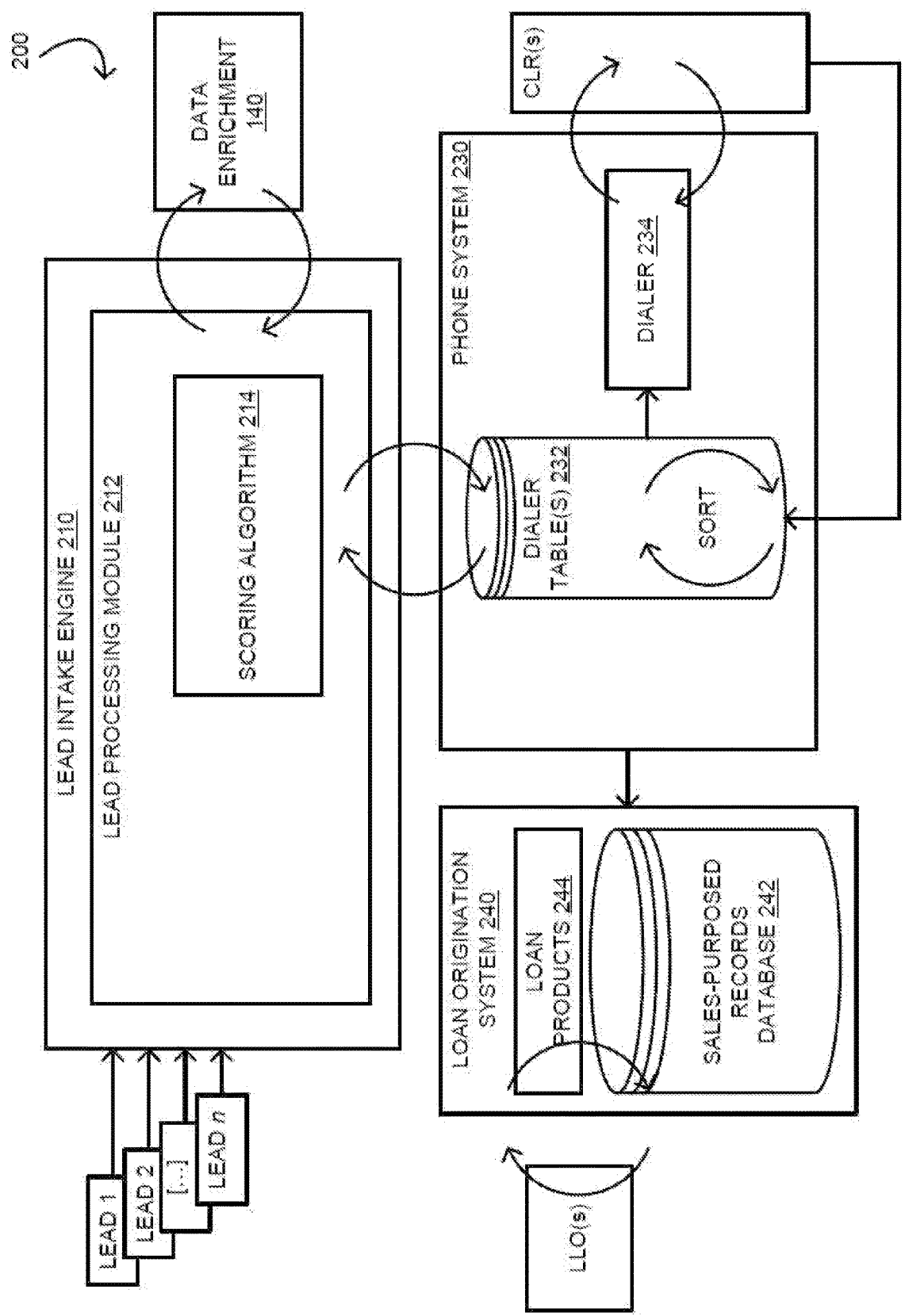
FIG. 2 provides a schematic illustrating a lead management system in accordance with some embodiments.
Figure 3:
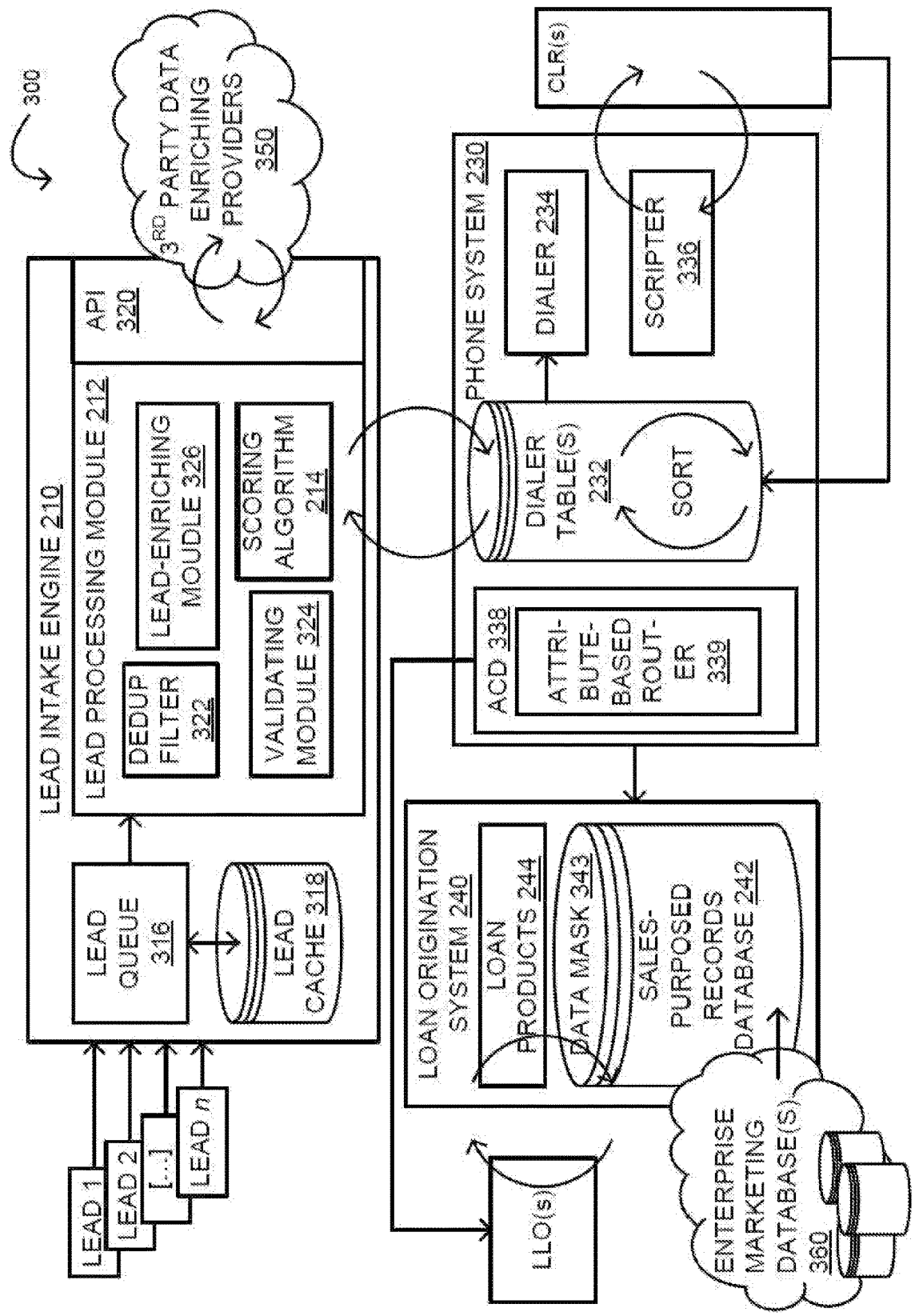
FIG. 3 provides a schematic illustrating a lead management system in accordance with some embodiments.

FIG. 2 provides a schematic illustrating a lead management system 200 in accordance with some embodiments. The lead management system 200 in support of the digital lending platform 100 includes or shares one or more features of the digital lending platform 100 such as the digital origination 110 and the data enrichment 140. The lead management system 200 can further include or share the marketing solutions 160, for example, one or more marketing databases 360 as shown in FIG. 3.

As shown in FIG. 2, the lead management system 200 includes a lead intake engine 210, a phone system 230, and a loan origination system 240. The lead management system 200 is optimized for speed-to-contact with telecommunications regulatory compliance.

The lead intake engine 210 includes a lead processing module 212, which, in turn, includes a scoring algorithm 214. The lead intake engine 210 is configured for processing sales leads. Processing sales leads includes enriching original data of at least a portion of incoming sales leads with complementary data to convert the portion of incoming sales leads into enriched sales leads. Processing sales leads also includes scoring the enriched sales leads and any of the incoming sales leads not converted to the enriched sales leads with scores by the scoring algorithm 214.

The complementary data is selected from TCPA-compliance data including phone type (e.g., wireline or wireless) and subscriber information; subject property information for secured loans such as mortgages including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

The phone system 230 includes one or more dialer tables 232 and a dialer 234. The phone system 230 includes the dialer 234 configured to dial phone numbers for the sales leads from the one or more dialer tables 232 of the phone system 230. The one or more dialer tables 232 are sorted in accordance with the scores of the sales leads by the lead intake engine 210.

The loan origination system 240 includes a sales-purposed records database 242 and loan products 244. The loan origination system 240 is configured to create a sales-purposed record in a sales-purposed records database 242 for each sales lead using the original data, the complementary data, or a combination thereof. The loan origination system 240 is configured to create the record up to at least a time of the dialer 234 dialing a phone number associated with the record.

FIG. 3 provides a schematic illustrating a lead management system 300 in accordance with some embodiments. As shown in FIG. 3, the lead management system 300 includes the lead intake engine 210, the phone system 230, and the loan origination system 240; however, the lead management system 300 includes additional features as set forth herein below.

As set forth herein above, the lead intake engine 210 includes the lead processing module 212, which, in turn, includes the scoring algorithm 214. As shown in FIG. 3, the lead intake engine 210 can further include a lead queue 316 and a lead cache 318, and the lead processing module 212 can further include a deduplicating filter 322, a validating module 324, and a lead-enriching module 326. The lead queue 316 is configured to queue the incoming sales leads, and the lead cache 318 is configured to cache the incoming sales leads should any adverse conditions occur downstream such as a processing bottleneck or a power outage. The deduplicating filter 322 is configured to remove duplicates of the sales leads. The validating module 324 is configured to validate loan inquiries of the sales leads, themselves, the original data of the incoming sales leads, or both. The lead-enriching module 326 is configured to coordinate with third-party data-enriching providers 350 to enrich original data of at least a portion of the incoming sales leads with the complementary data set forth herein above to convert the portion of incoming sales leads into enriched sales leads.

Again, the lead intake engine 210 is configured for processing sales leads, and processing the sales lead includes enriching the original data of at least a portion of incoming sales leads with complementary data to convert the portion of incoming sales leads into enriched sales leads. The enriched sales leads can be intermittently further enriched at any time the complementary data is made available by the third-party data-enriching providers 350 by way of an application programming interface ("API") 320 of the lead intake engine 210 or the lead processing module 212 thereof exposed to the third-party data-enriching providers 350. Any of the enriched sales leads further enriched by the third-party data-enriching providers 350 can be subsequently rescored by the scoring algorithm 214. The one or more dialer tables 232 of the phone system 230 are concomitantly sorted in accordance with the scores of the sales leads by the lead intake engine 210 while or, otherwise, at a same time as, the enriched sales leads are further enriched by the third-party data-enriching providers 350.

As set forth herein above, the phone system 230 includes the one or more dialer tables 232 and the dialer 234. As shown in FIG. 3, the phone system 230 can further include a scripter 336 configured to provide customized scripts to Customer Liaison Representatives ("CLRs") in a call center. The scripter 336 is configured to provide each customized script with one or more questions for each sales lead in accordance with the original data of the sales lead, the complementary data provided by the third-party data-enriching providers 350, or the combination thereof. The one or more questions can be alternatively or additionally in accordance with an age of the sales lead, a campaign of the sales lead, or any combination of the foregoing.

Any answers provided by potential borrowers to the one or more questions asked by the CLRs from the customized scripts can be automatically logged in the one or more dialer tables 232 such as by an automated speech recognition service. Alternatively, the CLRs can manually enter any of the answers in the one or more dialer tables 232 to log in the one or more dialer tables 232 any of the answers provided by the potential borrowers. The answers can be logged in the one or more dialer tables 232 to enrich the original data of a different, as-of-yet-to-be-enriched portion of the incoming sales leads and, thereby, convert the different portion of incoming sales leads into normalized sales leads. The normalized sales leads effectively upconvert inexpensive or poor-quality sales leads into a more standard sales leads. The answers provided by the potential borrowers to the one or more questions asked by the CLRs from the customized scripts can also be logged in the one or more dialer tables 232 to further enrich already enriched sales leads. Each normalized sales lead or enriched sales lead further enriched with the answers provided by the potential borrowers can be rescored by the scoring algorithm 214 up to at least a time of call transfer from a CLR to a licensed loan officer ("LLO") by way of the phone system 230.

As shown in FIG. 3, the phone system 230 can further include an automatic call distributor ("ACD") 338 and an attribute-based router 339 thereof. Each LLO of a number of LLOs can be assigned a unique phone number with one or more associated LLO attributes configured for attribute-based routing of phone calls by the attribute-based router 339. The one or more attributes of the LLO are selected from, but are not limited to, one or more licensing states, experience with one or more loan products 244, one or more languages spoken, and combinations thereof. Call transfers from the CLRs to any available LLOs are in accordance with matches between the one or more LLO attributes and the normalized sales leads or enriched sales leads further enriched with the answers provided by the potential borrowers. As such, the phone system 230 includes a contextual awareness configured to connect the potential borrowers to the appropriate LLOs.

As set forth herein above, the loan origination system 240 includes the sales-purposed records database 242 and the loan products 244. As shown in FIG. 3, the lead management system can further include one or more enterprise marketing databases 360 tied into the loan origination system 240. The one or more enterprise marketing databases 360 are configured to store marketing information including one or more points of interaction for each potential borrower having established at least one point of interaction with the digital lending platform 100 or the lead management system 200. The loan origination system 240 is configured to request the marketing information from the enterprise marketing database 360 and populate the sales-purposed record for each sales lead in the sales-purposed records database 242 with the one or more points of interaction for each potential borrower.

As shown in FIG. 3, the lead management system can further include a configurable mask 343 or a mask-enabling viewing tool available to LLO configured to mask information in the sales-purposed records database 242 not relevant to one or more sales strategies, information potentially detrimental to the one or more sales strategies, or a combination thereof.

Figure 4:
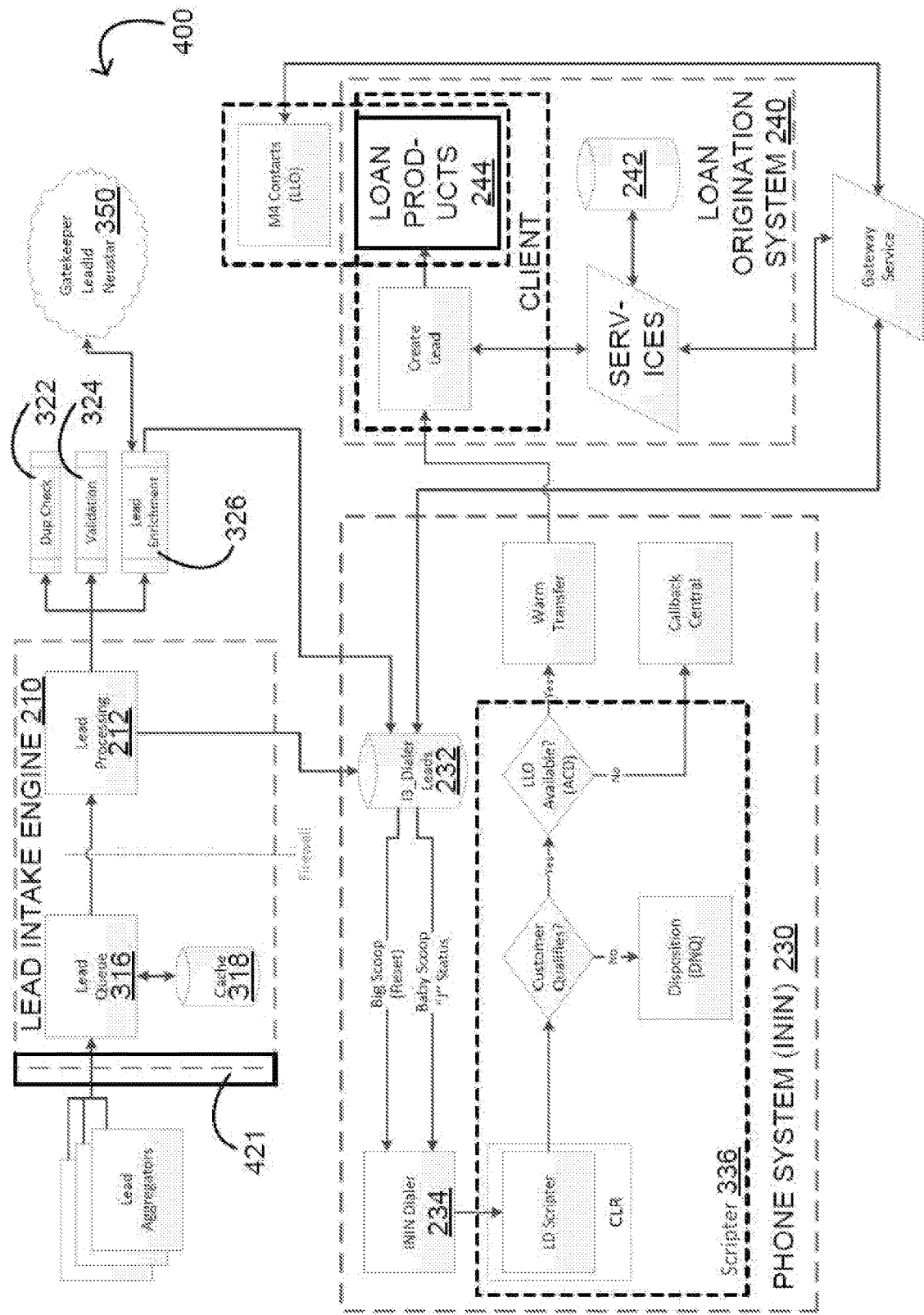
FIG. 4 provides a schematic illustrating a lead management system including a process flow therethrough in accordance with some embodiments.

FIG. 4 provides a schematic illustrating a lead management system 400 including a process flow in accordance with some embodiments. As shown in FIG. 4, the lead management system 400 includes the lead intake engine 210, the phone system 230, and the loan origination system 240; however, the lead management system 400 further includes the process flow as set forth herein below.

Sales leads corresponding to potential borrowers are generated through one or more lending exchanges. If, for example, an online lending exchange, potential borrowers fill in online applications for mortgages and submit the online applications, thereby providing incoming sales leads, which can be aggregated sales leads as shown in FIG. 4. An API 421 of the lead intake engine 210 provides the original data of the incoming sales leads to the lead queue 316 and the lead cache 318, which lead cache 318 can be a Structured Query Language ("SQL") database in some embodiments. Submission of the online applications and population of the lead queue 316 occurs as quickly as supporting networks allow up to and including real-time. However, due to extrinsic factors that can affect timing of the incoming sales leads from submission of the online applications to receipt of the original data therefrom, the lead intake engine 210 can include a tracking mechanism to determine ages of the incoming sales leads (e.g., a 5-second-old sales lead vs. a 5-hour-old sales lead). The ages of the sales leads can be used for purchasing decisions with respect to purchasing the sales leads, as well as metrics such as speed-to-contact. For example, speed-to-contact with the lead management system is about 5-7 seconds in some embodiments.

As set forth herein above, the incoming sales leads and any of the sales lead already in the lead management system 400 (e.g., any of the sales leads already in the dialer table 232) can be processed by way of the lead intake engine 210. In no particular order, the lead intake engine 210 is configured to remove duplicates of the sales leads by way of the deduplicating filter 322, validate loan inquiries of the sales leads by way of the validating module 324, and coordinate with the third-party data-enriching providers 350 by way of the lead-enriching module 326 to enrich and convert the incoming sales leads into enriched sales leads or further enrich already enriched sales leads. While not shown in FIG. 4, the scoring algorithm 214 is configured to continuously score or rescore the sales leads upon any enrichment of the sales leads by way of the lead-enriching module 326 and the third-party data-enriching providers 350, the answers provided by the potential borrowers to the questions asked by the CLRs from the customized scripts, or a combination thereof (See FIG. 5.)

Figure 5:
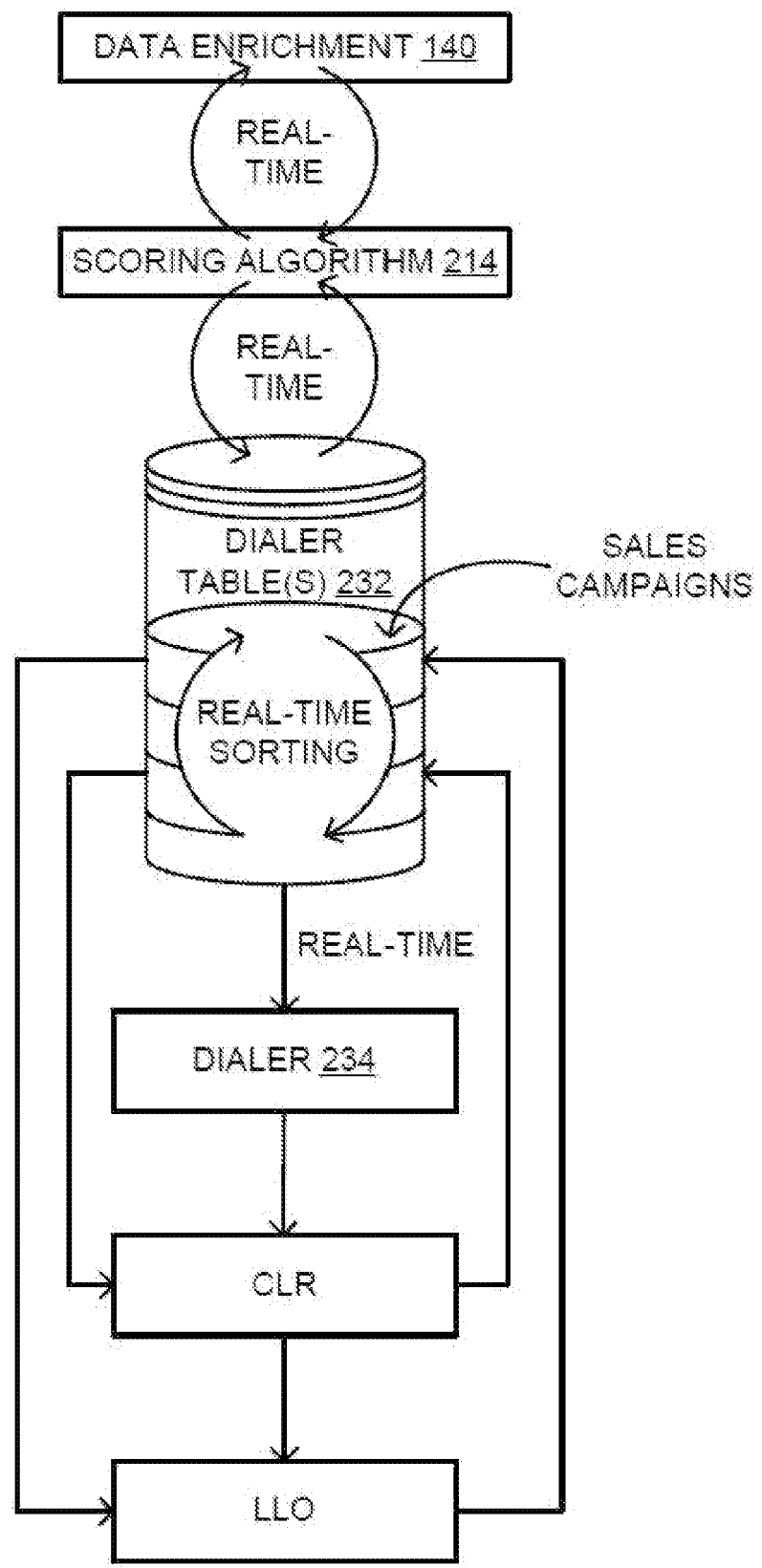
FIG. 5 provides a schematic illustrating real-time lead processing in accordance with some embodiments.

As the lead intake engine 210 processes, enriches, and scores the sales leads, the sales leads are provided by the lead intake engine 210 to the one or more dialer tables 232 of the phone system 230, which one or more dialer tables 232 can also be one or more SQL databases. As the sales leads are received by the one or more dialer tables 232, the one or more dialer tables 232 sort the sales leads in accordance with the scores for the sales leads provided by the scoring algorithm 214. Sorting the sales leads puts the sales leads into different sales campaigns, some of which campaigns are higher priority campaigns than other campaigns. Typically, the higher priority campaigns include potential borrowers with higher credit scores, lower loan-to-value ratios, and the like, which translates to lower risk loans. During the time sales leads are received by the one or more dialer tables 232 and sorted, the dialer 234, too, dials phone numbers for the sales leads from the one or more dialer tables 232 of the phone system 230, thereby, connecting the potential borrowers with the CLRs and their customized scripts generated on-the-fly. As such, the lead intake engine 210 and the phone system 230 work together in concert and as quickly as supporting networks allow (e.g., up to and including real-time) to put the potential borrowers in contact with the CLRs. The CLRs, in turn, put the potential borrowers in contact with LLOs if the potential borrowers qualify. FIG. 5 provides a schematic illustrating real-time lead processing in accordance with the foregoing. It should be noted that data enrichment of the sales leads continuously occurs throughout the lead management system (including while CLRs and LLOs are on calls), and the sales leads are likewise continuously scored upon any data enrichment of any kind.

As set forth herein above, the scripter 336 of the phone system 230 is configured to provide each customized script with one or more questions for each sales lead. Any answers provided by a potential borrower to the one or more questions asked by a CLR from a customized script is logged in the one or more dialer tables 232. While such answers are used for data enrichment, the answers are also used to either disqualify (e.g., does not qualify ["DNQ"]) the potential borrower or immediately qualify the potential borrow to speak with an LLO. This is shown in the process flow of the scripter 336 in FIG. 4. If the potential borrower immediately qualifies to speak with an LLO, the CLR transfers the potential borrower to an available LLO having a good match between one or more LLO attributes and the sales leads in view of the answers provided by the potential borrower. At the time of transferring the potential borrower to the LLO, a sales-purposed record for the potential borrow is created in the sales-purposed records database 242 of the loan origination system 240 for the LLO in his or her sales discussion with the potential borrower regarding the loan products 244.

Figure 6:
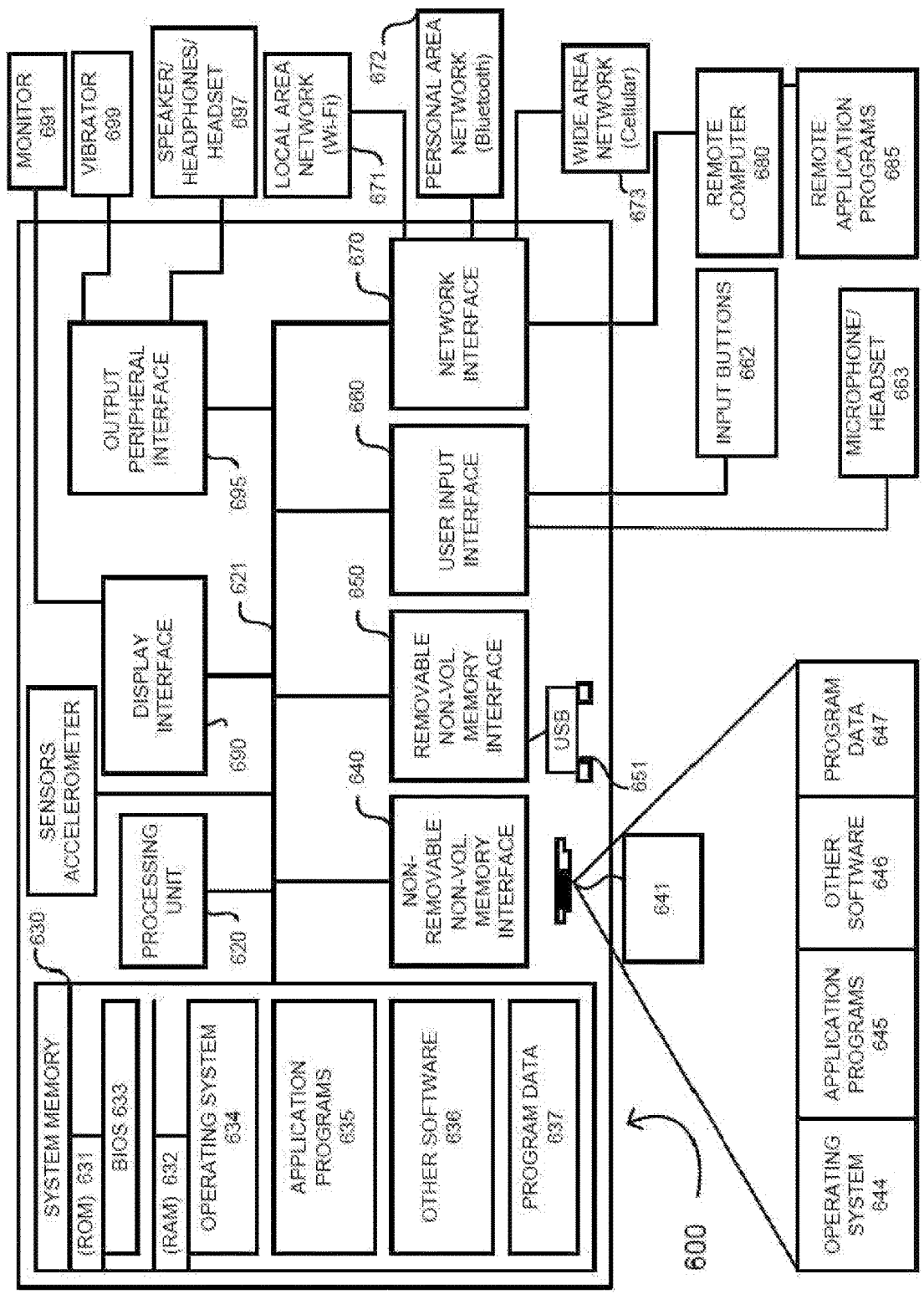
FIG. 6 provides a schematic illustrating components of a network host in accordance with some embodiments.

FIG. 6 provides a schematic illustrating components of a network host 600 such as any one or more server hosts of the lead management system in accordance with some embodiments. Components of the network host 600 vary in accordance with host type. As such, each and every component shown and described in reference to FIG. 6 need not be included in each host type. Furthermore, each host type can further include components not shown or described in reference to FIG. 6 but otherwise described herein.

As shown, components of the network host 600 can include, but are not limited to, a processing unit 620 having one or more processing cores, a primary or system memory 630, and a system bus 621 that couples various system components including the system memory 630 to the processing unit 620. The system bus 621 can be any of several types of bus structures selected from a memory bus or memory controller, a peripheral bus, and a local bus using any of a variety of bus architectures.

The network host 600 can include a variety of computer-readable media. Computer-readable media can be any media that can be accessed by the network host 600 and includes both volatile and nonvolatile media, as well as removable and non-removable media. By way of example, and not limitation, use of computer-readable media includes storage of information, such as computer-readable instructions, data structures, other executable software, or other data. Computer-readable media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium that can be used to store the desired information for access by the network host 600. Transitory media such as wireless channels are not included in the computer-readable media. Communication media typically embody computer-readable instructions, data structures, other executable software, or other transport mechanisms and includes any information delivery media. As an example, some client hosts on a network might not have optical or magnetic storage.

The system memory 630 includes computer-readable media in the form of volatile or nonvolatile memory such as read only memory ("ROM") 631 and random-access memory ("RAM") 632. A basic input-output system 633 ("BIOS") containing the basic routines that help to transfer information between elements within the network host 600, such as during start-up, is typically stored in ROM 631. RAM 632 typically contains software or data that are immediately accessible for operations by the processing unit 620. By way of example, and not limitation, FIG. 6 illustrates that RAM 632 can include a portion of the operating system 634, application programs 635, other executable software 636, and program data 637.

The network host 600 can also include other computer-readable media. By way of example only, FIG. 6 illustrates a solid-state memory 641. Other computer-readable media that can be used in the example operating environment include, but are not limited to, universal serial bus ("USB") drives and devices, flash memory cards, solid state RAM, solid state ROM, or the like. The solid-state memory 641 is typically connected to the system bus 621 through a non-removable memory interface such as interface 640, and USB drive 651 is typically connected to the system bus 621 by a removable memory interface such as interface 650.

The drives and their associated computer-readable media provide storage of computer-readable instructions, data structures, other executable software, or other data for the network host 600. In FIG. 6, for example, the solid-state memory 641 is illustrated for storing operating system 644, application programs 645, other executable software 646, or program data 647. Note that these components can either be the same as or different from operating system 634, application programs 635, other executable software 636, and program data 637. Operating system 644, application programs 645, other executable software 646, and program data 647 are given different numbers here to illustrate that, at a minimum, they are different copies.

A user can enter commands and information into the network host 600 through input devices such as a keyboard, touchscreen, or software or hardware input buttons 662, a microphone 663, a pointing device such as a mouse, or scrolling input component such as a trackball or touch pad. The microphone 663 can cooperate with speech recognition software. These and other input devices are often connected to the processing unit 620 through a user input interface 660 that is coupled to the system bus 621 but can be connected by other interface and bus structures, such as a parallel port, game port, or USB. A display monitor 691 or other type of display screen device is also connected to the system bus 621 via an interface such as a display interface 690. In addition to the monitor 691, the network host 600 can also include other peripheral output devices such as speakers 697, a vibrator 699, and other output devices, which can be connected through an output peripheral interface 695.

The network host 600 can operate in a networked environment using logical connections to one or more other network hosts such as network host 680. Like the network host 600, the network host 680 can be a personal computer, a server, a router, a network PC, a peer device, or another network node. The logical connections depicted in FIG. 6 can include a personal area network ("PAN") 672 (e.g., Bluetooth®), a local area network ("LAN") 671 (e.g., Wi-Fi), and a wide area network ("WAN") 673 (e.g., cellular network), but can also include other networks such as a personal area network (e.g., Bluetooth®). Such networking environments are commonplace in offices, enterprise-wide computer networks, intranets and the Internet. A browser application can be resident on the network host 600 and stored in the memory.

When used in a LAN networking environment, the network host 600 is connected to the LAN 671 through a network interface or adapter 670, which can be, for example, a Bluetooth® or Wi-Fi adapter. When used in a WAN networking environment (e.g., Internet), the network host 600 can include some means for establishing communications over the WAN 673. With respect to telecommunication technologies, for example, a radio interface, which can be internal or external, can be connected to the system bus 621 via the network interface 670, or another appropriate mechanism. In a networked environment, other software depicted relative to the network host 600, or portions thereof, can be stored in the remote memory storage device. By way of example, and not limitation, FIG. 6 illustrates remote application programs 685 as residing on the network host 680. It will be appreciated that the network connections shown are examples and other means of establishing a communications link between the network hosts can be used.

As discussed, the network host 600 can include a processing unit 620, a memory (e.g., ROM 631, RAM 632, etc.), an AC power input, a display screen, and built-in Wi-Fi circuitry to wirelessly communicate with other network hosts connected to the network.

Another device that can be coupled to system bus 621 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied into a non-transitory computer-readable medium. A computer-readable medium includes any mechanism that stores information in a form readable by a computer. For example, a non-transitory machine-readable medium can include ROM; RAM; magnetic disk storage media; optical storage media; flash memory devices; DVDs, EPROMs, EEPROMs, FLASH memory, magnetic or optical cards, or any type of media suitable for storing electronic instructions.

An application described herein includes, but is not limited to, software applications and programs that are part of an operating system or integrated with or on an application layer thereof. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a network host, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

Figure 7:
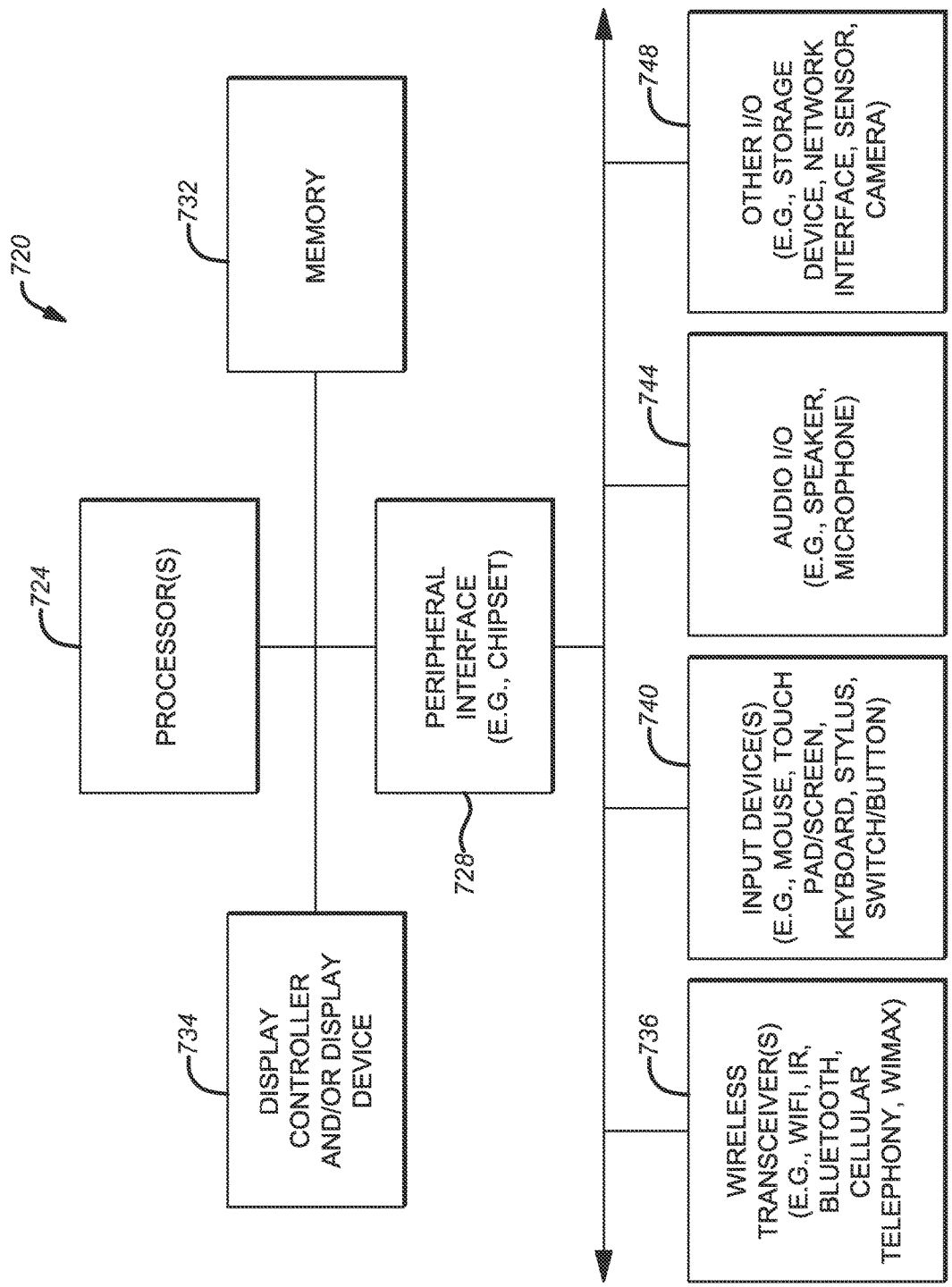
FIG. 7 provides an exemplary block illustration of a data processing system that may be used in conjunction with a digital lending platform in accordance with various embodiments of the present disclosure.

Turning, now, to FIG. 7, a block diagram illustrates an exemplary data processing system 720 that may be used in conjunction with the digital lending platform 100 to perform any of the processes or methods described herein. System 720 may represent circuitry within a desktop, a tablet, a server, a mobile phone, a personal digital assistant (PDA), a personal communicator, a network router or hub, a wireless access point (AP) or repeater, a set-top box, or any combination thereof.

In an embodiment, illustrated in FIG. 7, system 720 includes a processor 724 and a peripheral interface 728, also referred to herein as a chipset, to couple various components to the processor 724, including a memory 732 and devices 736-748 via a bus or an interconnect. Processor 724 may represent a single processor or multiple processors with a single processor core or multiple processor cores included therein. Processor 724 may represent one or more general-purpose processors such as a microprocessor, a central processing unit (CPU), or the like. More particularly, processor 724 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 724 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 724 is configured to execute instructions for performing the operations and steps discussed herein.

Peripheral interface 728 may include a memory control hub (MCH) and an input output control hub (ICH). Peripheral interface 728 may include a memory controller (not shown) that communicates with a memory 732. The peripheral interface 728 may also include a graphics interface that communicates with graphics subsystem 734, which may include a display controller and/or a display device. The peripheral interface 728 may communicate with the graphics device 734 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 724. In such a configuration, the peripheral interface 728 operates as an interface chip performing some functions of the MCH and ICH. Furthermore, a graphics accelerator may be integrated within the MCH or the processor 724.

Memory 732 may include one or more volatile storage (or memory) devices, such as random access memory (RAM), dynamic RAM (DRAM), synchronous DRAM (SDRAM), static RAM (SRAM), or other types of storage devices. Memory 732 may store information including sequences of instructions that are executed by the processor 724, or any other device. For example, executable code and/or data of a variety of operating systems, device drivers, firmware (e.g., input output basic system or BIOS), and/or applications can be loaded in memory 732 and executed by the processor 724. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 728 may provide an interface to IO devices, such as the devices 736-748, including wireless transceiver(s) 736, input device(s) 740, audio IO device(s) 744, and other IO devices 748. Wireless transceiver 736 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 740 may include a mouse, a touch pad, a touch sensitive screen (which may be integrated with display device 734), a pointer device such as a stylus, and/or a keyboard (e.g., physical keyboard or a virtual keyboard displayed as part of a touch sensitive screen). For example, the input device 740 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 744 may include a speaker and/or a microphone to facilitate voice-enabled functions, such as voice recognition, voice replication, digital recording, and/or telephony functions. Other optional devices 748 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 748 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

A non-transitory CRM including executable instructions can be executed on any one or more of the server hosts by one or more processors to cause the server host to instantiate at least a portion of the lead management system described herein. Once instantiated, the server host can operate the lead management system at least in part from a primary memory of the server host. Operating the lead management system includes operating the lead intake engine 210, the phone system 230, and the loan origination system 240.

Operating the lead management system includes processing sales leads with the lead processing module 212 of the lead intake engine 210, sorting the one or more dialer tables 232 of the phone system 230, dialing phone numbers for the sales leads with the dialer 234 of the phone system 230, and creating a sales-purposed record for each sales lead with the loan origination system 240. Processing the sales leads includes enriching original data of at least a portion of the incoming sales leads with complementary data to convert the portion of incoming sales leads into enriched sales leads. Processing the sales leads also includes scoring the enriched sales leads and any of the incoming sales leads not converted to the enriched sales leads with scores by the scoring algorithm 214. Sorting the one or more dialer tables 232 includes sorting the one or more dialer tables 232 in accordance with the scores of the sales leads by the lead intake engine 210. Dialing the phone numbers for the sales leads includes dialing the phone numbers from the one or more dialer tables 232 with the dialer 234. Creating the sales-purposed record includes creating the record in the sales-purposed records database 242 of the loan origination system 240 for each sales lead using the original data, the complementary data, or a combination thereof. The record is created in the sales-purposed records database 242 up to at least a time of the dialer 234 dialing a phone number associated with the record. Components of the lead intake engine 210, the phone system 230, and the loan origination system 240 form the lead management system optimized for speed-to-contact with telecommunications regulatory compliance.

Operating the lead management system further includes removing duplicates of the sales leads, validating loan inquiries of the sales leads, and enriching the original data of the portion of incoming sales leads. Removing the duplicates of the sales leads includes removing the duplicates with the deduplicating filter 322 of the lead processing module 212. Validating loan inquiries of the sales leads includes validating the loan inquiries, themselves, or the sales leads, the original data of the incoming sales leads, or both with the validating module 324 of the lead processing module 212. Enriching the original data of the portion of incoming sales leads includes enriching the original data with the complementary data to convert the portion of incoming sales leads into enriched sales leads by way of the lead-enriching module 326 configured to coordinate with the third-party data-enriching providers 350.

Operating the lead management system further includes enriching already enriched sales leads, rescoring any of the already enriched sales leads, and sorting the one or more dialer tables 232 in accordance with the scores of the sales leads. Further enriching already enriched sales leads includes intermittently further enriching the already enriched sales leads by way of the third-party data-enriching providers 350 and the application programming interface 320 of the lead management system exposed to the third-party data-enriching providers 350. Rescoring any of the already enriched sales leads includes rescoring by the scoring algorithm 214 any of the already enriched sales leads further enriched by the third-party data-enriching providers 350. Sorting the one or more dialer tables 232 includes concomitantly sorting the one or more dialer tables 232 in accordance with the scores of the sales leads by the lead intake engine 210 while or, otherwise, at a same time as, the already enriched sales leads are further enriched by the third-party data-enriching providers 350.

Operating the lead management system further includes providing the customized scripts with the scripter 336 of the phone system 230 to the CLRs in the call center. Each customized script includes one or more questions for each sales lead in accordance with the original data, the complementary data, or the combination thereof of the sales lead; an age of the sales lead; a campaign of the sales lead; or a combination thereof.

Operating the lead management system further includes logging in the one or more dialer tables 232 any answers provided by the potential borrowers to the questions asked by the CLRs from the customized scripts, as well as rescoring by the scoring algorithm 214 each normalized sales lead or enriched sales lead further enriched with the answers provided by the potential borrowers. Logging in the one or more dialer tables 232 any answers provided by the potential borrowers includes automatically logging in the one or more dialer tables 232 any of the answers provided by the potential borrowers to the questions asked by the CLRs from the customized scripts. Alternatively, the CLRs can manually enter any of the answers in the one or more dialer tables 232 to log in the one or more dialer tables 232 any of the answers provided by the potential borrowers. Rescoring by the scoring algorithm 214 includes rescoring each normalized sales lead or enriched sales lead further enriched with the answers provided by the potential borrowers up to at least a time of call transfer from a CLR to an LLO by way of the phone system 230.

Operating the lead management system further includes assigning to each LLO of a number of LLOs a unique phone number and one or more associated LLO attributes configured for attribute-based routing of phone calls by the automatic call distributor 338. Call transfers from CLRs to any available LLOs are in accordance with matches between the one or more LLO attributes and the normalized sales leads or enriched sales leads further enriched with the answers provided by the potential borrowers.

Operating the lead management system further includes storing marketing information in the one or more enterprise marketing databases 360, requesting the marketing information from the one or more enterprise marketing databases 360 by the loan origination system 240, and populating the sales-purposed record for each sales lead with the marketing information. The marketing information includes one or more points of interaction for each potential borrower having established at least one point of interaction with the lead management system.

Operating the lead management system further includes masking with the configurable mask or the mask-enabling viewing tool information not relevant to one or more sales strategies, information potentially detrimental to the one or more sales strategies, or a combination thereof in the sales database.

The concepts provided herein including the particular embodiments thereof represent a technological advancement in lead management, which includes, inter alia, a technological advancement in speed-to-contact. Speed-to-contact is an important metric to vendors because up to about half of sales go to vendors that call potential buyers (e.g., potential borrowers) first upon learning of the potential buyers' interests in one or more products or services. Due to the computer-related technology in which lead management is currently based, speeds-to-contact are on the order of just a few minutes. Therefore, the lead management system provided herein is also necessarily rooted in computer-related technology in order to offer improved speeds-to-contact on the order of seconds. Furthermore, the lead management system integrates some aspects of sales management, thereby providing a synergistic technological advancement in sales management as well. The technological advancement in sales management includes CLR scripts customized on-the-fly and attribute-based routing of phone calls from the CLRs to the best available LLOs, which, again, is made possible by way of the computer-related technology in which the lead management system is based. Such customized scripts and attribute-based routing bolster gains made by the improved speeds-to-contact of the lead management system in making sales.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A digital lending platform operable by way of a set of executable instructions stored in a non-transient machine-readable medium, the platform comprising:
   a processor;
   a network interface configured to provide access to a network; and
   a memory communicatively coupled to the processor, wherein the memory comprises a lead intake engine including a lead processing module configured to:
   process processing sales leads including enriching original data of at least a portion of incoming sales leads with complementary data;
   convert the portion of incoming sales leads into enriched sales leads;
   score the enriched sales leads and any of the incoming sales leads not converted to the enriched sales leads with scores by a scoring algorithm;
   a phone system including a dialer for dialing phone numbers for the sales leads from one or more dialer tables of the phone system sorted in accordance with the scores of the sales leads by the lead intake engine;
   an artificial intelligence (AI) module employing a neural network that is configured to obtain and process fragmented data; and self-correct based on a reward feedback circuit for modifying one or more assigned weights with respect to the fragmented data;
   wherein an attribute-based router is configured to route phone calls using one or more attributes; and
   a loan origination system for creating a sales-purposed record in a sales database for each sales lead using the original data, the complementary data, or a combination thereof up to at least a time of the dialer dialing a phone number associated with the record.

2. The platform of claim 1, wherein the lead processing module includes a deduplicating filter for removing duplicates of the sales leads, a validating module for validating loan inquiries of the sales leads, the original data of the incoming sales leads, or both, and a lead-enriching module for coordinating with third-party data-enriching providers to enrich the original data of the portion of incoming sales leads with the complementary data to convert the portion of incoming sales leads into the enriched sales leads.

3. The platform of claim 1, wherein the enriched sales leads are intermittently further enriched by third-party data-enriching providers by way of an application programming interface of a lead management system that is exposed to the third-party data-enriching providers, wherein any of the enriched sales leads further enriched by the third-party data-enriching providers are rescored by the scoring algorithm, and wherein the one or more dialer tables of the phone system are concomitantly sorted in accordance with the scores of the sales leads by the lead intake engine while the enriched sales leads are further enriched by the third-party data-enriching providers.

4. The platform of claim 3, wherein the lead management system is operable by way of a set of executable instructions stored in a non-transient machine-readable medium and comprises components of the lead intake engine, the phone system, and the loan origination system.

5. The platform of claim 4, wherein the lead management system is optimized for speed-to-contact with telecommunications regulatory compliance.

6. The platform of claim 1, wherein the complementary data is selected from Telephone Consumer Protection Act compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

7. The platform of claim 1, wherein the phone system includes a scripter for providing customized scripts to customer liaison representatives in a call center, the scripter configured to provide each customized script with one or more questions for each sales lead in accordance with the original data, the complementary data, or the combination thereof of the sales lead; an age of the sales lead; a campaign of the sales lead; or a combination thereof.

8. The platform of claim 7, wherein any answers provided by potential borrowers to the questions asked by the customer liaison representatives from the customized scripts are manually or automatically logged in the one or more dialer tables to enrich the original data of a different portion of the incoming sales leads and, thereby, convert the different portion of incoming sales leads into normalized sales leads, further enrich the enriched sales leads with the answers provided by the potential borrowers, or both, and wherein each normalized sales lead or enriched sales lead further enriched with the answers provided by the potential borrowers is rescored by the scoring algorithm up to at least a time of call transfer from a customer liaison representative to a licensed loan officer by way of the phone system.

9. The platform of claim 8, wherein each licensed loan officer of a plurality of licensed loan officers is assigned a unique phone number and one or more associated licensed loan officer attributes, the one or more attributes of the licensed loan officer selected from one or more licensing states, experience with one or more particular loan products, one or more languages spoken, and combinations thereof, and wherein call transfers from the customer liaison representatives to any available licensed loan officers are in accordance with matches between the one or more LLO attributes and the normalized sales leads or enriched sales leads further enriched with the answers provided by the potential borrowers.

10. The platform of claim 1, further comprising: one or more enterprise marketing databases for storing marketing information including one or more points of interaction for each potential borrower having established at least one point of interaction with the digital lending platform, wherein the loan origination system is configured to request the marketing information and populate the sales-purposed record for each sales lead with the one or more points of interaction for each potential borrower.

11. The platform of claim 1, wherein the sales database is configured with a configurable mask or a mask-enabling viewing tool to mask information not relevant to one or more sales strategies, information potentially detrimental to the one or more sales strategies, or a combination thereof.

12. A method for a non-transitory computer-readable medium including executable instructions that, when executed on a server host by one or more processors, cause the server host to instantiate at least a portion of a lead management system configured to perform a plurality of steps, comprising:
processing sales leads with a lead processing module of a lead intake engine including enriching original data of at least a portion of incoming sales leads with complementary data to convert the portion of incoming sales leads into enriched sales leads, and scoring the enriched sales leads and any of the incoming sales leads not converted to the enriched sales leads with scores by a scoring algorithm;
sorting one or more dialer tables of a phone system in accordance with the scores of the sales leads by the lead intake engine;
dialing phone numbers for the sales leads from the one or more dialer tables with a dialer of the phone system;
routing phone using an attribute-based router that is configured to route calls using one or more attributes, the attributed comprising one or more languages spoken;
creating a sales-purposed record in a sales database of the loan origination system for each sales lead using the original data, the complementary data, or a combination thereof up to at least a time of the dialer dialing a phone number associated with the record; and
utilizing an artificial intelligence (AI) module that employs a neural network configured to obtain and process fragmented data; and self-correct based on a reward feedback circuit for modifying one or more assigned weights with respect to the fragmented data;
wherein components of the lead intake engine, the phone system, and the loan origination system form the lead management system optimized for speed-to-contact with telecommunications regulatory compliance.

13. The method of claim 12, wherein the plurality of steps further comprises removing duplicates of the sales leads with a deduplicating filter of the lead processing module; validating loan inquiries of the sales leads, the original data of the incoming sales leads, or both with a validating module of the lead processing module; and enriching the original data of the portion of incoming sales leads with the complementary data to convert the portion of incoming sales leads into the enriched sales leads by way of a lead-enriching module configured to coordinate with third-party data-enriching providers.

14. The method of claim 12, wherein the plurality of steps further comprises intermittently further enriching already enriched sales leads by way of third-party data-enriching providers and an application programming interface of the lead management system exposed to the third-party data-enriching providers; rescoring by the scoring algorithm any of the already enriched sales leads further enriched by the third-party data-enriching providers; and concomitantly sorting the one or more dialer tables of the phone system in accordance with the scores of the sales leads by the lead intake engine while the already enriched sales leads are further enriched by the third-party data-enriching providers.

15. The method of claim 12, wherein the complementary data is selected from Telephone Consumer Protection Act compliance data including phone type and subscriber information; subject property information including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

16. The method of claim 12, wherein the plurality of steps further comprises providing customized scripts with a scripter of the phone system to customer liaison representatives in a call center, wherein each customized script includes one or more questions for each sales lead in accordance with the original data, the complementary data, or the combination thereof for the sales lead, an age of the sales lead, a campaign of the sales lead, or a combination thereof.

17. The method of claim 16, wherein the plurality of steps further comprises manually or automatically logging in the one or more dialer tables any answers provided by potential borrowers to the questions asked by the customer liaison representatives from the customized scripts to enrich the original data of a different portion of the incoming sales leads and, thereby, convert the different portion of incoming sales leads into normalized sales leads, further enrich the enriched sales leads with the answers provided by the potential borrowers, or both; and
rescoring by the scoring algorithm each normalized sales lead or enriched sales lead further enriched with the answers provided by the potential borrowers, wherein the rescoring is up to at least a time of call transfer from a customer liaison representative to a licensed loan officer by way of the phone system.

18. The method of claim 17, wherein the plurality of steps further comprises assigning to each licensed loan officer of a plurality of licensed loan officers a unique phone number and one or more associated licensed loan officer attributes configured for attribute-based routing of phone calls by an automatic call distributor, the one or more attributes of the licensed loan officer selected from one or more licensing states, experience with one or more particular loan products, one or more languages spoken, and combinations thereof, wherein call transfers from customer liaison representatives to any available licensed loan officers are in accordance with matches between the one or more licensed loan officer attributes and the normalized sales leads or enriched sales leads further enriched with the answers provided by the potential borrowers.

19. The method of claim 12, wherein the plurality of steps further comprises storing marketing information in one or more enterprise marketing databases, the marketing information including one or more points of interaction for each potential borrower having established at least one point of interaction with the lead management system; requesting the marketing information from the one or more enterprise marketing databases by the loan origination system; and populating the sales-purposed record for each sales lead with the one or more points of interaction for each potential borrower.

20. The method of claim 12, wherein the plurality of steps further comprises masking with a configurable mask or a mask-enabling viewing tool information not relevant to one or more sales strategies, information potentially detrimental to the one or more sales strategies, or a combination thereof in the sales database.

* * * * *